(12) United States Patent
Dekel et al.

(10) Patent No.: US 7,454,074 B2
(45) Date of Patent: *Nov. 18, 2008

(54) SYSTEM AND METHOD FOR THE LOSSLESS PROGRESSIVE STREAMING OF IMAGES OVER A COMMUNICATION NETWORK

(75) Inventors: Shai Dekel, Or-Yehuda (IL); Nitzan Goldberg, Beit-Shemesh (IL)

(73) Assignee: General Electric Company, Schenectady, NY (US)

( * ) Notice: Subject to any disclaimer, the term of this patent is extended or adjusted under 35 U.S.C. 154(b) by 490 days.

This patent is subject to a terminal disclaimer.

(21) Appl. No.: 11/184,365

(22) Filed: Jul. 18, 2005

(65) Prior Publication Data

US 2005/0271283 A1 Dec. 8, 2005

Related U.S. Application Data

(63) Continuation of application No. 09/837,862, filed on Apr. 17, 2001, now Pat. No. 7,024,046.

(60) Provisional application No. 60/198,017, filed on Apr. 18, 2000.

(51) Int. Cl.
*G06K 9/36* (2006.01)
(52) U.S. Cl. ..................................... 382/240
(58) Field of Classification Search ............. 382/240
See application file for complete search history.

(56) References Cited

U.S. PATENT DOCUMENTS 3,580,655 A 5/1971 Leith et al.

(Continued)

FOREIGN PATENT DOCUMENTS

EP 0510933 10/1992

(Continued)

OTHER PUBLICATIONS

Advertising brochure entitled "Portable Image Format," for Mr. SID by Lizardteck Inc., 1999.

(Continued)

*Primary Examiner*—Tom Y Lu
(74) *Attorney, Agent, or Firm*—Zaretsky Patent Group PC; Howard Zaretsky

(57) ABSTRACT

A lossless image streaming system for the transmission of images over a communication network. The system eliminates the necessity to store a compressed version of the original image, by losslessly streaming ROI data using the original stored image. The imaging system also avoids the computationally intensive task of compression of the full image. When a user wishes to interact with a remote image, the imaging client generates and sends a ROI request list to the imaging server. The request list can be ordered according to the particular progressive mode selected (e.g., progressive by quality, resolution or spatial order). The imaging server performs a fast preprocessing step in near real time after which it can respond to any ROI requests in near real time. When a ROI request arrives at the server, a progressive image encoding algorithm is performed, but not for the full image. Instead, the encoding algorithm is performed only for the ROI. Since the size of the ROI is bounded by the size and resolution of the viewing device at the client and not by the size of the image, only a small portion of the full progressive coding computation is performed for a local area of the original image.

51 Claims, 26 Drawing Sheets

U.S. PATENT DOCUMENTS

| | | | |
|---|---|---|---|
| 3,950,103 A | 4/1976 | Schmidt-Weinmar |
| 4,136,954 A | 1/1979 | Jamieson |
| 4,155,097 A | 5/1979 | Lux |
| 4,190,861 A | 2/1980 | Lux |
| 4,223,354 A | 9/1980 | Noble et al. |
| 4,393,456 A | 7/1983 | Marshall, Jr. |
| 4,569,075 A | 2/1986 | Nussbaumer |
| 4,599,567 A | 7/1986 | Goupillaud et al. |
| 4,652,881 A | 3/1987 | Lewis |
| 4,663,660 A | 5/1987 | Fedele et al. |
| 4,674,125 A | 6/1987 | Carlson et al. |
| 4,701,006 A | 10/1987 | Perlmutter |
| 4,760,563 A | 7/1988 | Beylkin |
| 4,785,348 A | 11/1988 | Fonsalas et al. |
| 4,785,349 A | 11/1988 | Keith et al. |
| 4,799,179 A | 1/1989 | Masson et al. |
| 4,805,129 A | 2/1989 | David |
| 4,815,023 A | 3/1989 | Arbeiter |
| 4,817,182 A | 3/1989 | Adelson et al. |
| 4,821,223 A | 4/1989 | David |
| 4,827,336 A | 5/1989 | Acampora et al. |
| 4,829,378 A | 5/1989 | LeGall |
| 4,837,517 A | 6/1989 | Barber |
| 4,839,889 A | 6/1989 | Gockler |
| 4,864,398 A | 9/1989 | Avis et al. |
| 4,868,868 A | 9/1989 | Yazu et al. |
| 4,894,713 A | 1/1990 | Delogne et al. |
| 4,897,717 A | 1/1990 | Hamilton et al. |
| 4,904,073 A | 2/1990 | Lawton et al. |
| 4,922,544 A | 5/1990 | Stansfield et al. |
| 4,929,223 A | 5/1990 | Walsh |
| 4,936,665 A | 6/1990 | Whitney |
| 4,974,187 A | 11/1990 | Lawton |
| 4,982,283 A | 1/1991 | Acampora |
| 4,985,927 A | 1/1991 | Norwood et al. |
| 4,987,480 A | 1/1991 | Lippman et al. |
| 4,999,705 A | 3/1991 | Puri |
| 5,000,183 A | 3/1991 | Bonnefous |
| 5,001,764 A | 3/1991 | Wood et al. |
| 5,014,134 A | 5/1991 | Lawton et al. |
| 5,018,210 A | 5/1991 | Merryman et al. |
| 5,049,992 A | 9/1991 | Citta et al. |
| 5,049,993 A | 9/1991 | LeGall et al. |
| 5,068,911 A | 11/1991 | Resnikoff et al. |
| 5,072,308 A | 12/1991 | Lin et al. |
| 5,073,964 A | 12/1991 | Resnikoff |
| 5,081,645 A | 1/1992 | Resnikoff et al. |
| 5,095,447 A | 3/1992 | Manns et al. |
| 5,097,331 A | 3/1992 | Chen et al. |
| 5,101,280 A | 3/1992 | Moronaga et al. |
| 5,101,446 A | 3/1992 | Resnikoff et al. |
| 5,103,306 A | 4/1992 | Weiman et al. |
| 5,109,451 A | 4/1992 | Aono et al. |
| 5,121,191 A | 6/1992 | Cassereau et al. |
| 5,124,930 A | 6/1992 | Nicolas et al. |
| 5,128,757 A | 7/1992 | Citta et al. |
| 5,128,791 A | 7/1992 | LeGall et al. |
| 5,148,498 A | 9/1992 | Resnikoff et al. |
| 5,152,953 A | 10/1992 | Ackermann |
| 5,156,943 A | 10/1992 | Whitney |
| 5,173,880 A | 12/1992 | Duren et al. |
| 5,182,645 A | 1/1993 | Breeuwer et al. |
| 5,235,434 A | 8/1993 | Wober |
| 5,241,395 A | 8/1993 | Chen |
| 5,262,958 A | 11/1993 | Chui et al. |
| 5,335,016 A | 8/1994 | Nakagawa |
| 5,347,479 A | 9/1994 | Miyazaki |
| 5,381,145 A | 1/1995 | Allen et al. |
| 5,412,741 A | 5/1995 | Shapiro |
| 5,420,891 A | 5/1995 | Akansu |
| 5,453,945 A | 9/1995 | Tucker et al. |
| 5,495,292 A | 2/1996 | Zhang et al. |
| 5,497,435 A | 3/1996 | Berger |
| 5,534,925 A | 7/1996 | Zhong |
| 5,537,493 A | 7/1996 | Wilkinson |
| 5,546,477 A | 8/1996 | Knowles et al. |
| 5,563,690 A | 10/1996 | Hasegawa et al. |
| 5,602,589 A | 2/1997 | Vishwanath et al. |
| 5,606,359 A | 2/1997 | Youden et al. |
| 5,666,161 A | 9/1997 | Kohiyama et al. |
| 5,699,458 A | 12/1997 | Sprague |
| 5,710,835 A | 1/1998 | Bradley |
| 5,832,300 A | 11/1998 | Lowthert |
| 5,838,377 A | 11/1998 | Greene |
| 5,861,920 A | 1/1999 | Mead et al. |
| 5,867,602 A | 2/1999 | Zandi et al. |
| 5,872,965 A | 2/1999 | Petrick |
| 5,886,733 A | 3/1999 | Zdepski et al. |
| 5,968,465 A | 10/1999 | Koveal et al. |
| 5,982,362 A | 11/1999 | Crater et al. |
| 5,999,664 A | 12/1999 | Mahoney et al. |
| 6,038,257 A | 3/2000 | Brusewitz et al. |
| 6,049,342 A | 4/2000 | Nielson et al. |
| 6,049,821 A | 4/2000 | Therialut et al. |
| 6,314,452 B1 | 11/2001 | Dekel et al. |
| 6,711,297 B1 | 3/2004 | Change et al. |

FOREIGN PATENT DOCUMENTS

| | | |
|---|---|---|
| EP | 0593013 | 4/1994 |
| EP | 0611051 | 8/1994 |
| EP | 0622741 | 11/1994 |
| EP | 0701375 | 3/1996 |
| GB | 2211691 | 7/1991 |
| GB | 2284121 | 5/1995 |
| GB | 2285374 | 6/1995 |
| WO | WO 88/10049 | 12/1988 |
| WO | WO 91/03902 | 3/1991 |
| WO | WO 91/18361 | 11/1991 |
| WO | WO 94/23385 | 10/1994 |
| WO | WO 95/19683 | 7/1995 |
| WO | WO 96/09718 | 3/1996 |

OTHER PUBLICATIONS

Calderbank et al., "Wavelet Transforms that Map Integers to Integers," *J. Fourier Anal. Appl.*, 1998.

M. J. Cannavo, "RSNA Vendor Showcase Wealth of Web-based Teleradiology," *Telehealth Magazine*, pp. 57-59, 1999.

M. J. Cannavo, "Is It Safe," *Imaqing Economics*, 1999.

Daubechies et al., "Factoring Wavelet Transforms into Lifting Steps," *J. Fourier Anal. Appl.*, 4(3):247-269, 1998.

R. A. Devore, "Nonlinear Approximation," *Acta Numerica*, pp. 51-150, 1998.

A. Drukarev, "Compression Related Properties of Color Spaces," *Proc. SPIE*, 3024:855-863, 1997.

J.C. Hayes, "Revolutionary Protocol Speeds Electronic Image Delivery," *Telehealth Magazine*, 1999.

Mallat et al., "Understanding Image Transform Codes," Proc. SPIE Aerospace Conf., 1997.

Moffat et al., "Arithmetic Coding Revisited" Proc. DDC (Snowbird, Utah), pp. 202-211, 1995.

Moroney et al., "Color Space Selection for JPEG image Compression," *J. Elec. Imaging*, 4(4):373-381, 1995.

L. J. Nelson, "Handling High-Performance Web Images for E-Commerce: Live Picture Meets Oracle," *Advanced Imaging*, pp. 68-70, 1999.

L. J. Nelson, "Image Compression Technology: For the Decade Ahead, Wavelet Soars!," *Advanced Imaging*.

Said et al., "An Image Multiresolution Representation for Lossless and Lossy Compression," *IEEE Trans. Image Proc.*, 5(9):1303-1310, 1996.

Said et al., "A New, Fast and Efficient Image Code Based on Set Partitioning in Hierarchical Trees," *IEEE Trans. Circuits and Systems for Video Tech.*, 6(3):243-250, 1996.

J. M. Shapiro, "Embedded Image Coding Using Zerotrees of Wavelet Coefficients," *IEEE Trans. Sig. Proc.*, 41(12):3445-3462, 1993.

Sheng et al., "Lossy to Lossless Image Compression Using Reversible Integer Wavelet Transform," al., *Proc. IEEE International Conf. On image Processinq* (SAIC), pp. 876-880, 1998.

D. Taubman, "High Performance Scalable Image Compression with EBCOT," *IEEE Transactions on Image Processing*, pp. 344-348, 1999.

P. Worthington, "Overcoming Bandwidth Limitations: Professional Image Sharing," *The Future Image Report*, 5(10), 1998.

Xiong et al., "A DCT-Based Embedded Image Coder," *IEEE Signal Proc. Letters*, 3(11), 1996.

Zandi et al., "CREW: Compression with reversible embedded wavelets," *Proc. of Data Compression Conference*, pp. 212-221, 1995.

JPEG2000 Image Coding System, JPEG 2000 Final Committee Draft Version 1.0, Mar. 16, 2000, pp. 109-128, Annex F.

JPEG2000 Image Coding System, JPEG 2000 Final Committee Draft Version 1.0, Annex B, pp. 53-70, Mar. 16, 2000.

RGB <-> YUV REVERSIBLE CONVERSION

FORWARD:

$$Y_r = \left\lfloor \frac{R+2G+B+2}{4} \right\rfloor$$

$$U_r = R - G$$

$$V_r = B - G$$

INVERSE:            1301

$$G = Y_r - \left\lfloor \frac{U_r + V_r + 2}{4} \right\rfloor$$

```
bitModel.startModel () ;
zeroCoefModel.startModel () ;
coefSignModel.startModel () ;

while (encoder.moreCoef ()) {
   if (encoder.isCoefReported ()) { arithmetic_encode_symbol (bitModel,encoder.reportedCoefPrec
isionBit ()) ;
   }
   else {
      if (encoder.isCoefExactZero ()) ;
      arithmetic_encode_symbol (zeroCoefModel,true) ;
      else {
        arithmetic_encode_symbol (zeroCoefModel,false) ;
        arithmetic_encode_symbol (coefSignModel,encoder.getCoe
fSign ()) ;
      }
    }
  }
}
```

FIG. 15a

```
bitModel.startModel () ;

for (int i = 0 ; i < hBlockSize ; i++) {
    for (int j = 0 ; j < hBlockSize ; j++) {
         arithmetic_encode_symbol (bitModel,
coefHalfBit [i] [j]) ;
      }
}
```

FIG. 15b

```
                    bitModel       .startModel() ;
zeroCoefModel.startModel() ;
coefSignModel.startModel() ;

decoder.initializeLSBPlaneCoefScan () ;

while (decoder.moreCoef ()) {
   if (decoder.isCoefReported ()) {
      if (decoder.isLHCoef ()) {
         decoder. updateLSB (0) ;
      }
      else {
         decoder.updateLSB (arithmetic_decoder_symbol (bitModel)) ;
      }
   }
   else {
      if (!decoder.isLHCoef ()) {
         if (!arithmetic_decoder_symbol (zeroCoefModel))
            decoder.setLSB (arithmetic_decoder_symbol (coefSignMode
            1)) ;
      }
   }
}
```

FIG.16a

```
bitModel.startModel () ;
for (int i = 0 ; i < hBlockSize ; i++) {
  for (int j = hBlockSize ; j ; j--,p++) {
    coefHlafBit [i] [j] = arithmetic_decoder_symbol (bitModel) ;
  }
}
```

FIG.16b

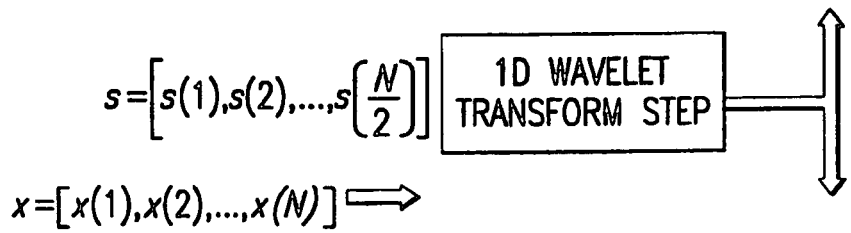
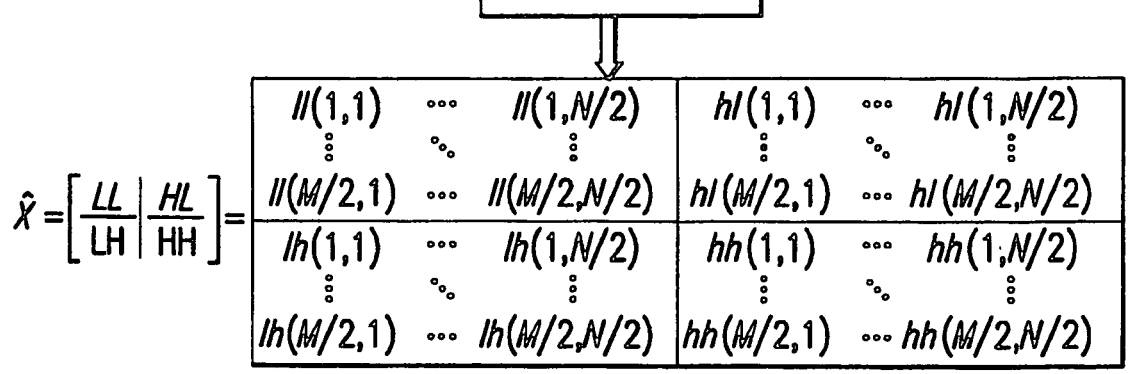
FIG. 18

LET $I$ BE THE ORIGINAL IMAGE,
FOR $0 < i <$ *LEVELS*
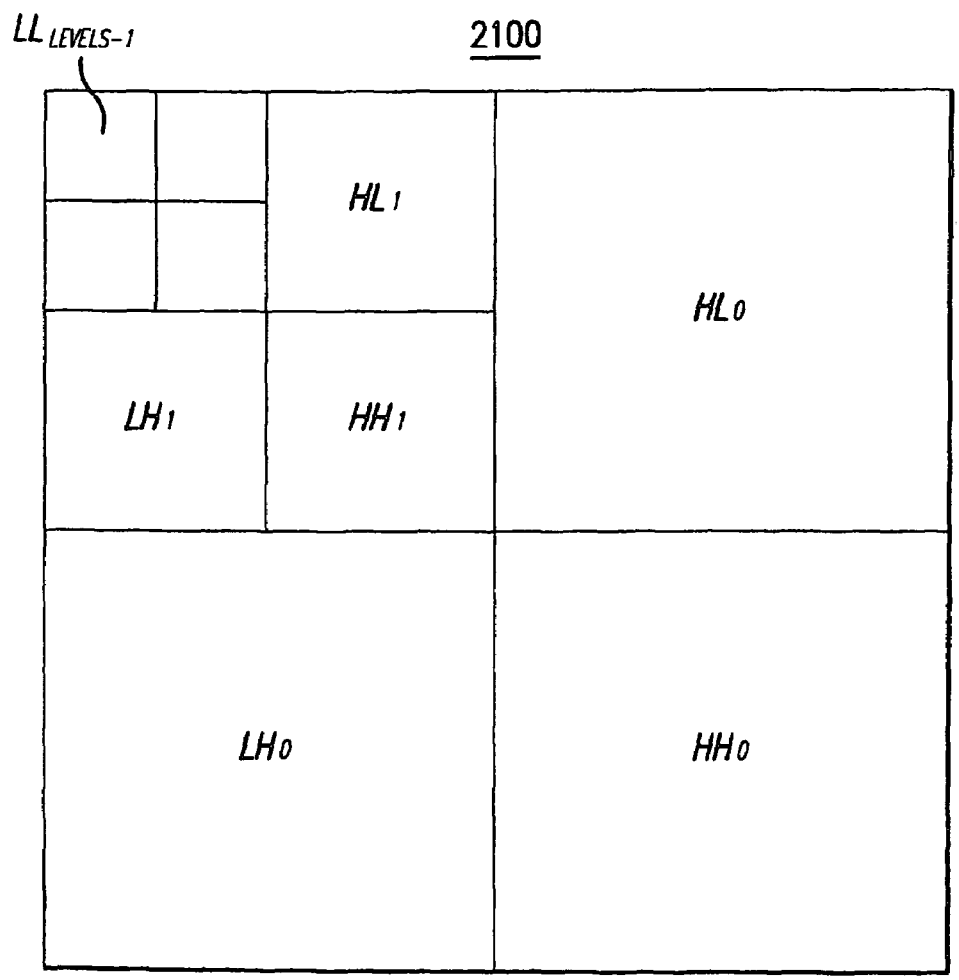
FIG. 21

SYSTEM AND METHOD FOR THE LOSSLESS PROGRESSIVE STREAMING OF IMAGES OVER A COMMUNICATION NETWORK

REFERENCE TO RELATED APPLICATIONS

This application is a continuation of U.S. application Ser. No. 09/837,862 filed Apr. 17, 2001, now U.S. Pat. No, 7,024,046 entitled "System and Method for the Lossless Progressive Streaming of Images Over a Communication Network," now U.S. Pat. No. 7,204,046, which claims priority to U.S. application Ser. No. 09/386,264, filed Aug. 31, 1999, now U.S. Pat. No. 6,314,452, entitled "System and Method for Transmitting A Digital Image Over A Communication Network" and U.S. Provisional Application No. 60/198,017, filed Apr. 18, 2000, entitled "Lossless Progressive Streaming of Images Over the Internet", all of which are incorporated herein by reference in their entirety.

FIELD OF THE INVENTION

This invention relates to systems and methods for transmission of still images over relatively low-speed communication channels. More specifically the invention relates to progressive image streaming over low speed communication lines, and may be applied to a variety of fields and disciplines, including commercial printing and medical imaging, among others.

BACKGROUND OF THE INVENTION

In a narrow bandwidth environment, a simple transfer to the client computer of any original image stored in the server's storage is obviously time consuming. In many cases the user only wishes to view a low resolution version of the image and perhaps several high-resolution details, in these instances it would be inefficient to transfer the full image. This problem can be overcome by storing images in a compressed format. Examples of such formats include standards such as Progressive JPEG (W. Pennebaker and J. Mitchel, "JPEG, still image data compression standard", VNR, 1993) or the upcoming JPEG2000 (D. Taubman, "High performance scalable image compression with EBCOT", preprint, 1999). These formats allow progressive transmission of an image such that the quality of the image displayed at the client computer improves during the transmission.

In some applications such as medical imaging, it is also necessary that whenever the user at the client computer is viewing a portion of the highest resolution of the image, the progressive streaming will terminate at lossless quality. This means that at the end of progressive transmission the pixels rendered on the screen are exactly the pixels of the original image. The current known "state-of-the-art" wavelet algorithms for progressive lossless streaming all have a major drawback: their rate-distortion behavior is inferior to the "lossy" algorithms. The implications of this include:

1. Whenever the user is viewing any low resolution version of the image (at low resolutions the term "lossless" is not well defined) more data needs to be sent for the same visual quality.
2. During the progressive transmission of the highest resolution, before lossless quality is achieved, more data needs to be sent for the same visual quality.

Researchers working in this field are troubled by these phenomena. F. Sheng, A. Bilgin, J. Sementilli and M. W. Marcellin state in "Lossy to Lossless Image Compression Using Reversible Integer Wavelet Transform", Proc. IEEE International Conf. On Image Processing, 1998: " . . . Improved lossy performance when using integer transforms is a pursuit of our on-going work." An example is provided in Table 1.

TABLE 1

Comparison of the lossy compression performances (implemented by the (7,9) Wavelet) to a lossless compression (implemented by a reversible (4,4) Wavelet) of "Barabara" image (PSNR (dB)) ([SBSM]).

| | Rate (bit per pixel) | | | | |
|---|---|---|---|---|---|
| Wavelet | 0.1 | 0.2 | 0.5 | 0.7 | 1.0 |
| Floating Point 7 × 9 | 24.18 | 26.65 | 31.64 | 34.17 | 36.90 |
| Reversible (4,4) | 23.89 | 26.41 | 31.14 | 33.35 | 35.65 |

As can be seen from Table 1, state of the art progressive lossless coding is inferior to lossy coding by more than 1 dB at high bit rates.

Indeed, intuitively, the requirement for lossless progressive image transmission should not affect the rendering of lower resolutions or the progressive "lossy" rendering of the highest resolution before lossless quality is obtained. The final lossless quality should be a layer that in some sense is added to a lossy algorithm with minor (if any) effect on its performance.

The main problem with known lossless wavelet algorithms, such as Set Partitioning in Hierarchical Trees (SPIHT) A. Said and W. Pearlman, "A new, fast and efficient image codec based on set partitioning", IEEE Trans. Circuits and Systems for Video Tech. 6 (1996), 243-250 and compression with reversible embedded wavelets (CREW) A. Zandi, J. D. Allen, E. L. Schwartz and M. Boliek, "CREW: Compression with reversible embedded wavelets", Proc. of Data Compression Conference (Snowbird, Utah), 212-221, 1995 is that they use special "Integer To Integer" transforms (see "Wavelet transforms that map integers to integers", A. Calderbank, I. Daubechies, W. Sweldens, B. L. Yeo, J. Fourier Anal. Appl., 1998). These transforms mimic "mathematically proven" transforms that work well in lossy compression using floating-point arithmetic implementations. Because they are constrained to be lossless, they do not approximate their related floating-point algorithms sufficiently well. Although in all previous work there have been attempts to correct this approximation in the progressive coding stage of the algorithm the bad starting point and an inefficient transform prevented previous authors from obtaining acceptable rate-distortion behavior.

The system and method of the present invention solves the rate-distortion behavior problem. Using the fact that images are two-dimensional signals, novel 2D lossless Wavelet transforms are disclosed that better approximate their lossy counterparts. As an immediate consequence the lossless progressive coding algorithm of the present invention has the same rate-distortion of a lossy algorithm during the lossy part of the progressive transmission.

SUMMARY OF THE INVENTION

The imaging system that is described below is directed to a lossless image streaming system that is different from traditional compression systems and overcomes the above problems. By utilizing a lossless means of progressive transmission, the pixels rendered on the screen at the end of transmission are exactly the pixels of the original image that were transmitted. The imaging system disclosed herein eliminates the need to store a compressed version of the original image, by streaming ROI data using the original stored image. The imaging system of the present invention also avoids the computationally intensive task of compression of the full image. Instead, once a user wishes to interact with a remote image, the imaging server performs a fast preprocessing step in near real time after which it can respond to any ROI requests also in near real time. When a ROI request arrives at the server, a sophisticated progressive image-encoding algorithm is performed, but not for the full image. Instead, the encoding algorithm is performed only for the ROI. Since the size of the ROI is bounded by the size and resolution of the viewing device at the client and not by the size of the image, only a small portion of the full progressive coding computation is performed for a local area of the original image. This local property is also true for the client. The client computer performs decoding and rendering only for the ROI and not for the full image. This real time streaming architecture (known commercially as Pixels-On-Demand™) requires different approaches even to old ideas. For example, similarly to some prior art, the present imaging system is based on wavelets. But while in other systems wavelet bases are selected according to their coding abilities, the choice of wavelet bases in the present imaging system depends more on their ability to perform well in the real time framework. The system of the present invention supports several modes of progressive transmission: by resolution, by accuracy and by spatial order.

BRIEF DESCRIPTION OF THE DRAWINGS

FIG. 13 a diagram depicting the RGB <–> YUV reversible conversion;

FIG. 15 is a sample pseudo-code of the encoding algorithm represented by: (a) Least significant bit plane scan pseudo-code (b) Half bit plane scan pseudo-code;

FIG. 16 is a sample pseudo-code of the decoding algorithm represented by: (a) Least significant bit plane scan pseudo-code (b) Half bit plane scan pseudo-code;

FIG. 18 is a diagram depicting the decomposition of one-dimensional signal x to the Low-subband s and the High-subband d and the separable decomposition of two-dimensional signal X into 4 matrices (subbands): LL, HL, LH and HH;

FIG. 21 is a diagram depicting the application of the full 2D Wavelet transform;

DETAILED DESCRIPTION OF THE INVENTION

1. Notation and Terminology

The following notation is used throughout this document

| Term | Definition |
| --- | --- |
| 1D | One dimensional |
| 2D | Two dimensional |
| 4D | Four dimensional |
| CDF | Cumulative Distribution Function |
| CD-ROM | Compact Disc-Read Only Memory |
| CREW | Compression with Reversible Embedded Wavelets |
| DVD | Digital Versatile Disc |
| EBCOT | Embedded block coding with optimal truncation |
| FIR | Finite Impulse Response |
| FP | Floating Point |
| FWT | Forward Wavelet Transform |
| GUI | Graphical User Interface |
| ID | Identification tag |
| IEEE | Institute of Electrical and Electronic Engineers |
| IWT | Inverse Wavelet Transform |
| JPEG | Joint Picture Entertainment Group |
| LSB | Least Significant Bit |
| PC | Personal Computer |
| PDF | Probability Density Function |
| RMS | Root Mean Square |
| ROI | Region Of Interest |
| SPHIT | Set Partitioning in Hierarchical Trees |
| URL | Uniform Resource Locator |

The following terminology and definitions apply throughout this document.

| Term | Definition |
| --- | --- |
| Rendering | Procedure to output/display a ROI of an image into a device such as a monitor, printer, etc. |

-continued

| Term | Definition |
|---|---|
| Multiresolution | A pyramidal structure representing an image at dyadic resolutions, beginning with the original image as the highest resolution. |
| Subband Transform/ subband coefficients | A method of decomposing an image (time domain) to frequency components (frequency domain). A representation of an image as a sum of differences between the dyadic resolutions of the image's multiresolution. |
| Wavelet Transform/ Wavelet coefficients | A special case of Subband Transform. |
| Progressive Transmission | Transmitting a given image in successive steps, where each step adds more detail to the rendering of the image |
| Progressive Rendering | A sequence of rendering operations, each adding more detail. |
| Progressive by accuracy | Transmit/render strong features first (sharp edges), less significant features (texture) last |
| Progressive by resolution | Transmit/render low resolution first, high resolution last |
| Progressive by spatial order | Transmit/render top of image first, bottom of image last |
| Distributed database | A database architecture that can be used in a network environment |
| Subband/Wavelet tile | A group of subband/wavelet coefficients corresponding to a time-frequency localization at some given spatial location and resolution/frequency |
| Subband/Wavelet data block | An encoded portion of a subband/wavelet tile that corresponds to some accuracy layer |

2. Overview of the Invention

Figure 1:
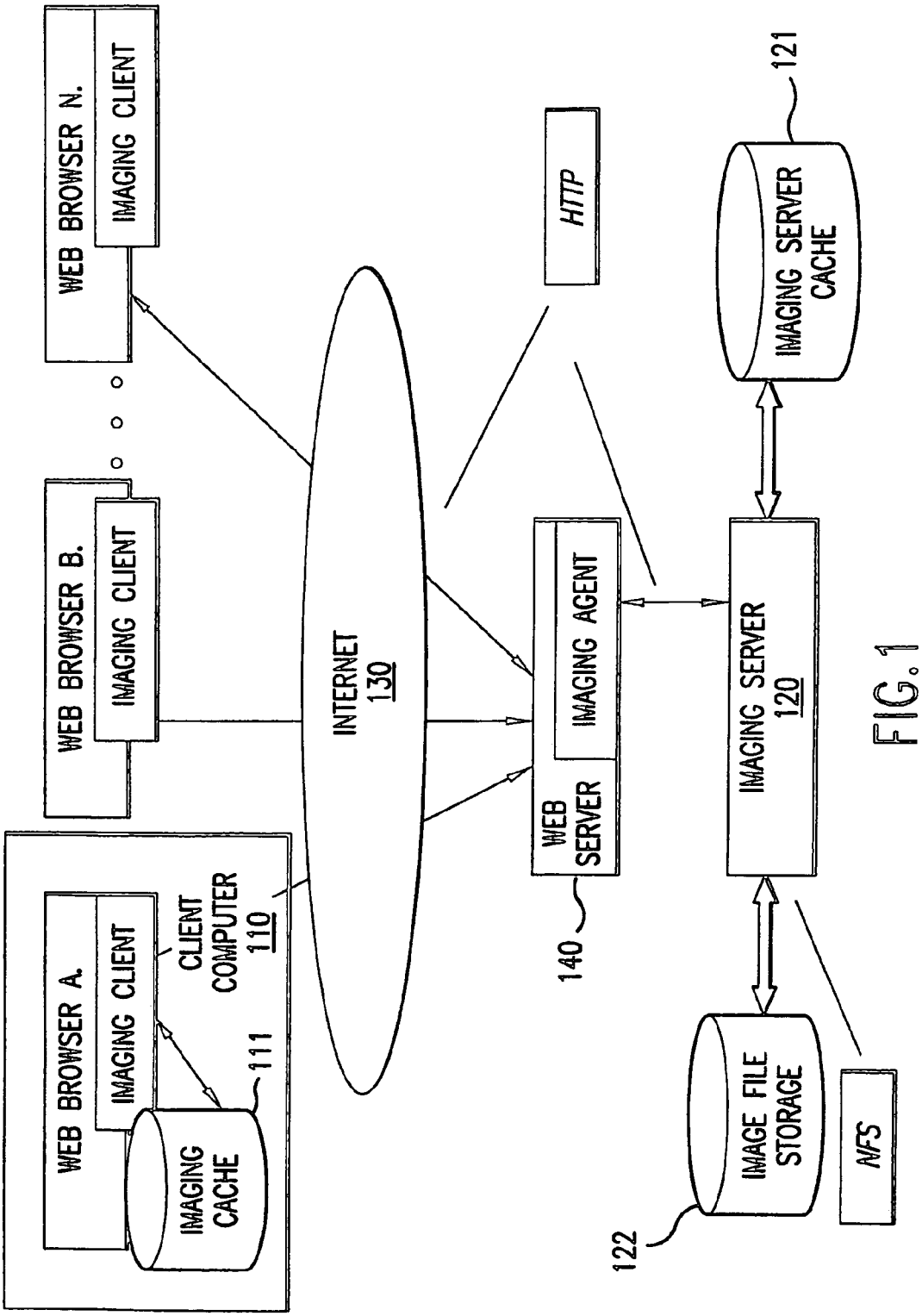
FIG. 1 is a system architecture block diagram.

Referring to FIG. 1, a block diagram is provided depicting the various components of the imaging system in one embodiment. A client computer 110 is coupled to a server computer 120 through a communication network 130.

In one embodiment, the client computer 110 and server computer 120 may comprise a PC-type computer operating with a Pentium-class microprocessor, or equivalent. Each of the computers 110 and 120 may include a cache 111, 121 respectively as part of its memory. The server may include a suitable storage device 122, such as a high-capacity disk, CD-ROM, DVD, or the like.

The client computer 110 and server computer 120 may be connected to each other, and to other computers, through a communication network 130, which may be the Internet, an Intranet (e.g., a local area network), a wide-area network, or the like. Those having ordinary skill in the art will recognize that any of a variety of communication networks may be used to implement the present invention.

Figure 2:
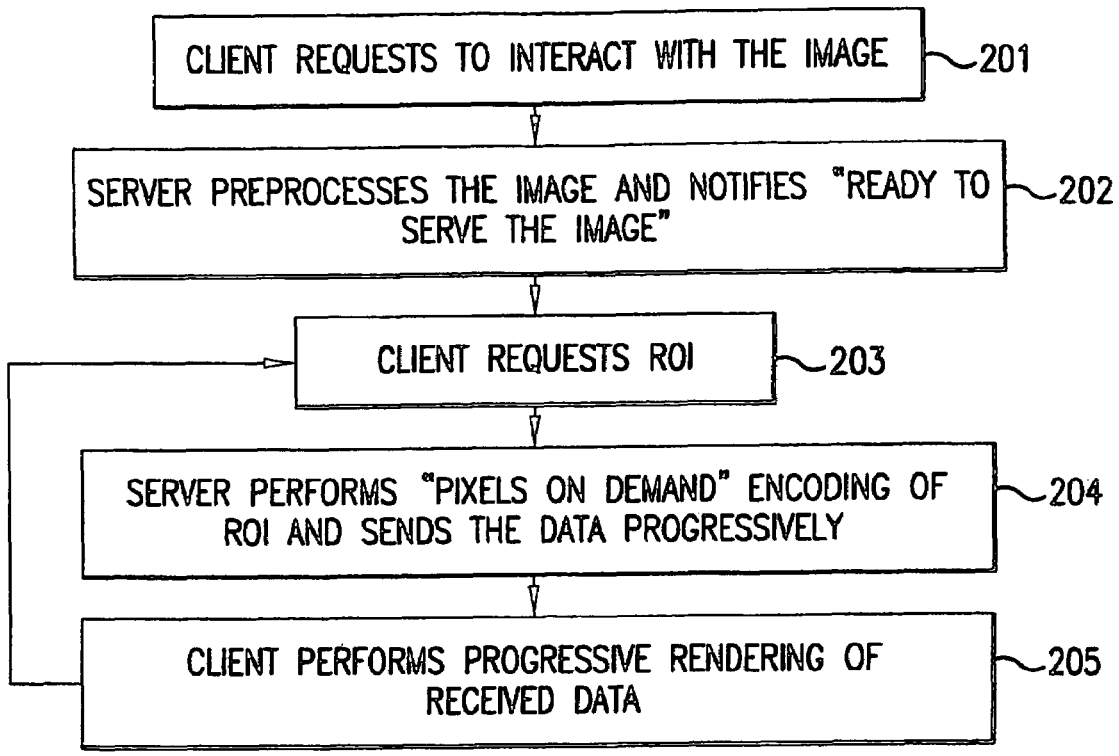
FIG. 2 is an imaging system workflow diagram.

With reference to FIG. 2, the system workflow is described. Using any browser type application, the user of the client computer 110 connects to the Web Server 140 or directly to the Imaging server 120 as described in FIG. 1. He/she then selects, using common browser tools an image residing on the Image file storage 122. The corresponding URL request is received and processed by the Imaging Server 120. In case results of previous computations on the image are not present in the Imaging Cache 121, the server performs a fast preprocessing algorithm (see §2.1) in a lossless mode. The result of this computation is inserted into the cache 121. Unlike prior art applications or methods that perform full progressive encoding of the image using an "offline" type method, the goal of the preprocessing step is to allow the server, after a relatively fast computational step, to serve any ROI specified by the user of the client computer. For example, for a 15 megabyte grayscale medical image, using the described (software) server, installed on a computer with a Pentium processor, fast disk, running Windows NT, the preprocessing step 501 will typically take 3 seconds. This is an order of magnitude faster than prior art "full" compression algorithm such as J. M. Shapiro, "An embedded hierarchical image coder using zero-trees of wavelet coefficients", IEEE Trans. Sig. Proc. 41 (1993), 3445-3462; A. Said and W. Pearlman, "A new, fast and efficient image codec based on set partitioning", IEEE Trans. Circuits and Systems for Video Tech. 6 (1996), 243-250; and D. Taubman, "High performance scalable image compression with EBCOT", IEEE Transactions on Image Processing 9 (2000), 1151-1170. Serving ROIs is sometimes referred to as "pixels-on-demand" which means a progressive transmission of any ROI of the image in "real-time", where the quality of the view improves with the transfer rate until a lossless view is received on the client side. Once the preprocessing stage is done, the server sends a notification message to the client that the "image is ready to be served". The server also transmits the basic parameters associated with the image such as dimensions, color space, etc. Upon receiving this notification, the client can select any ROI of the image using standard GUI. The ROI is formulated in step 203 into a request list that is sent to the server. Each such request corresponds to a data block as described in more detail in Section 4 hereinbelow. The order of requests in the list corresponds to some progressive mode selected in the context of the application such as "progressive by accuracy" rendering of the ROI. Upon receiving the ROI request list, the server processes the requests according to their order. For each such request the server checks if the corresponding data block exists in the cache 121. If not, the server then computes the data block, stores it in the cache and immediately sends it to the client. Once a data block that was requested arrives at the client, it is inserted into the cache 111. At various points in time during the transfer process, a decision rule invokes a rendering of the ROI. Obviously, if some of the data blocks required for a high quality rendering of the ROI, were requested from the server, but have not arrived yet, the rendering of the ROI will be of lower quality. But, due to the progressive request order, the rendering quality will improve with each received data block in an "optimal" way. In case the user changes the ROI, the rendering task at the client is canceled and a new request list corresponding to a new ROI, sent from the client to the server, will notify the server to terminate the previous computation and transmission task and begin the new one.

3. New Reversible Wavelet Transform

Several benefits of the rate-distortion behavior of the progressive lossless algorithm of the present invention are discussed below. Lossless wavelet transforms, must be integer-to-integer transforms, such that round-off errors are avoided. In order to demonstrate the difference between lossy and lossless transforms, let us look at the simplest wavelet, the Haar wavelet. Let x(k) be the $k^{th}$ component of the one-dimensional discrete signal x. The first forward Haar transform step, in its accurate "mathematical" form, is defined by:

$$\begin{cases} s(n) = \frac{1}{\sqrt{2}}(x(2n+1) + x(2n)), \\ d(n) = \frac{1}{\sqrt{2}}(x(2n+1) - x(2n)), \end{cases} \quad (3.1)$$

where s is a low-resolution version of x, and d is the "difference" between s and x. In the case of lossless transform, applying the above transform results in round-off error. One possibility is to apply the transform step suggested by A. Calderbank, I. Daubechies, W. Sweldens and B. L. Yeo, "Wavelet transforms that map integers to integers", Applied and Computational Harmonic Analysis 5 (1998), 332-369:

$$\begin{cases} s(n) = \left\lfloor \frac{x(2n+1) + x(2n)}{2} \right\rfloor, \\ d(n) = x(2n+1) - x(2n). \end{cases} \quad (3.2)$$

The notation $\lfloor \circ \rfloor$ denotes the floor function meaning "greatest integer less than or equal to $\circ$", e.g. $\lfloor 0.5 \rfloor = 0$, $\lfloor -1.5 \rfloor = -1$, $\lfloor 2 \rfloor = 2$, $\lfloor -1 \rfloor = -1$.

Figure 19:
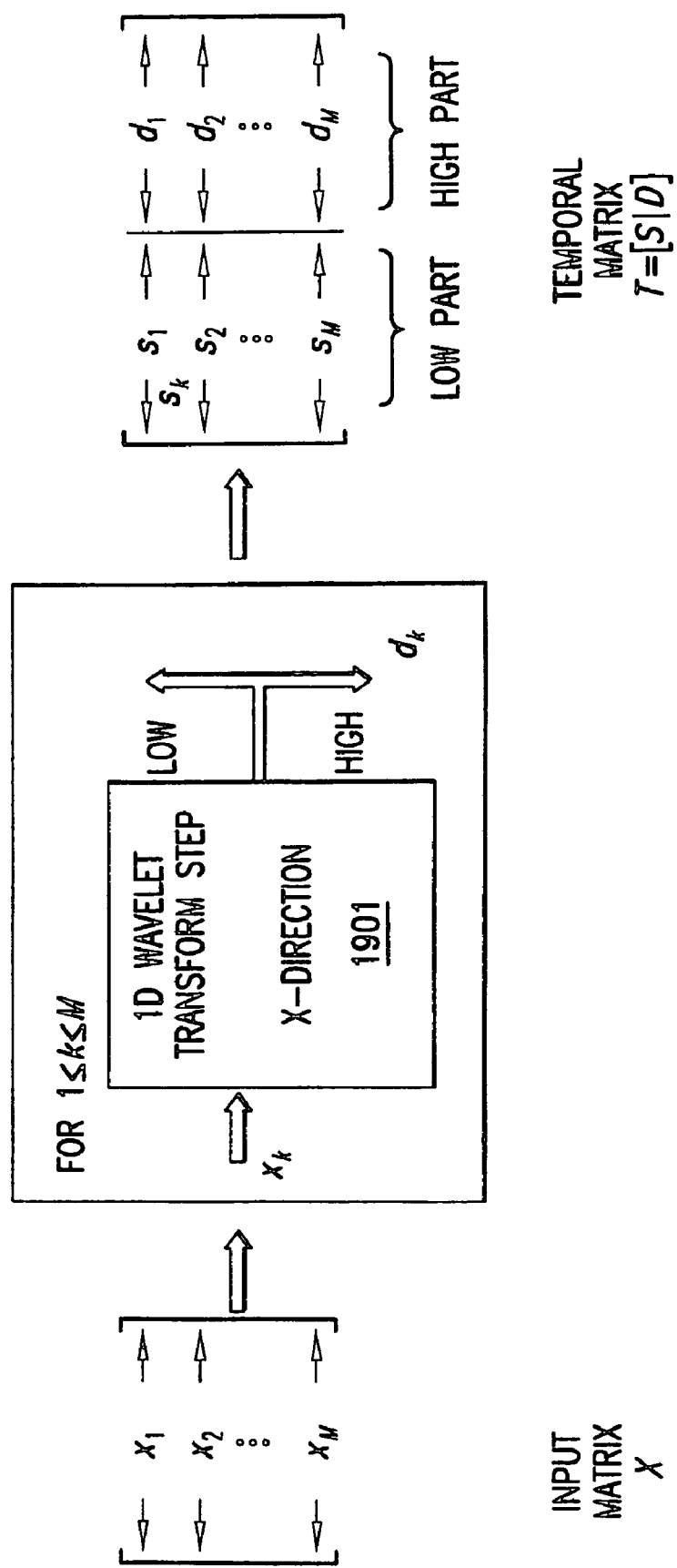
FIG. 19 is a diagram depicting the first stage of the 2D separable transform step in the X-direction.
Figure 20:
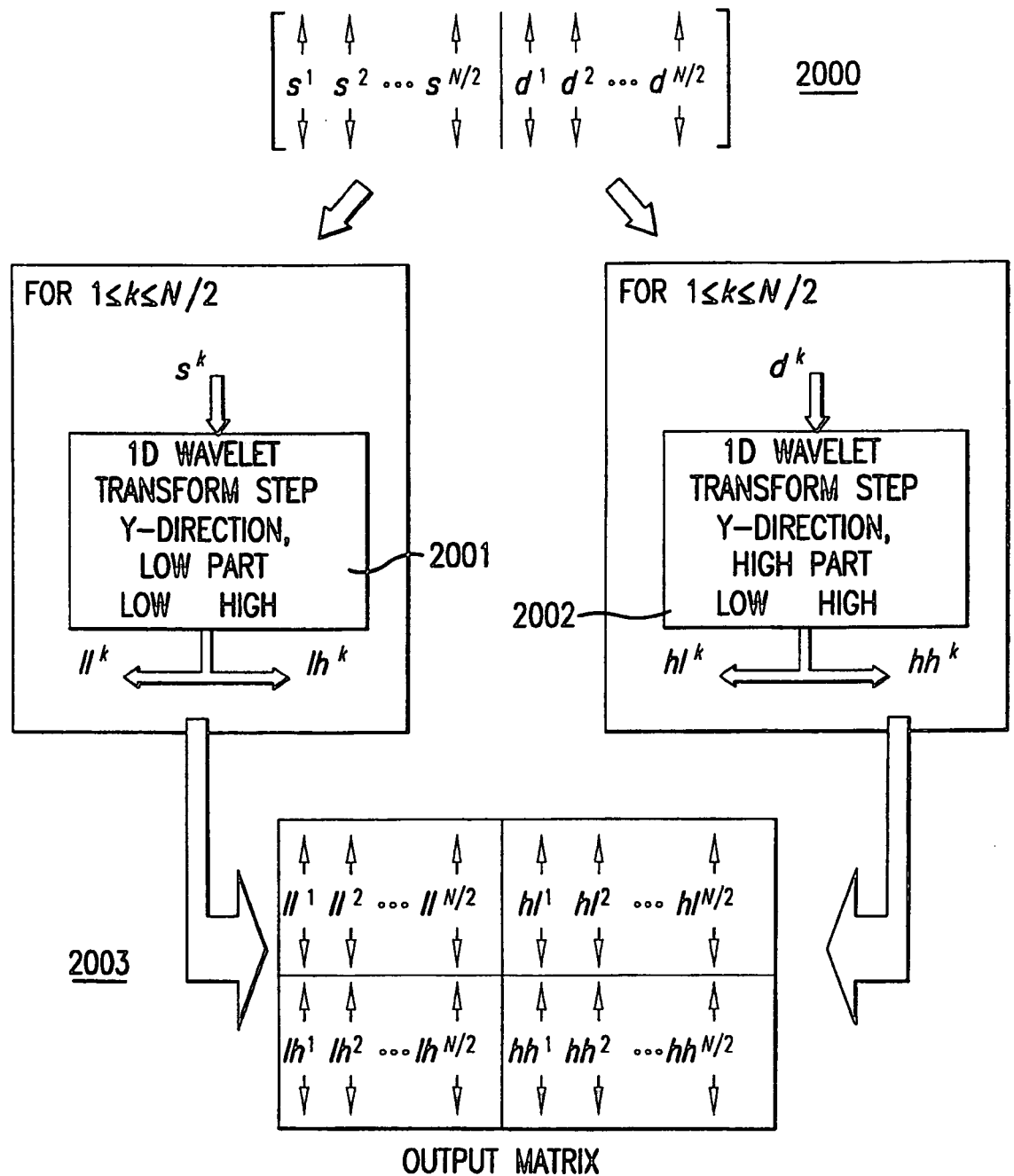
FIG. 20 is a diagram depicting the second stage of the 2D separable transform step in the Y-direction.

The one-dimensional transform step is generalized to a 2D separable transform step by applying the 1D transform step twice, first in the X-direction and than (on the first stage output) in the Y-direction as described in FIGS. 18, 19 and 20. The full 2D Wavelet transform is applied by using the 2D Wavelet transform step iteratively in the classic Mallat decomposition of the image (FIG. 21). See S. Mallat, A wavelet tour of signal processing, Academic Press, 1998, Section 7.7.

In (3.2) two properties are kept:
1. Reversibility, i.e., one can restore x(2n) and x(2n+1), by knowing s(n) and d(n), as follows:

$$\begin{cases} x(2n) = s(n) - \left\lfloor \frac{d(n)}{2} \right\rfloor, \\ x(2n+1) = d(n) + x(2n). \end{cases} \quad (3.3)$$

2. De-correlation, i.e., s(n) and d(n) contains the minimal number of bits required in order to follow property 1. For example, if the transform would have been defined by:

$$\begin{cases} s(n) = x(2n+1) + x(2n), \\ d(n) = x(2n+1) - x(2n), \end{cases} \quad (3.4)$$

then the least significant bit of s(n) and d(n) would have been the same and saved twice. In other words, there is a correlation between s(n) and d(n) in (3.4). From the view point of coding this should be avoided since there is a redundancy in transmitting this bit.

On the other hand, the important scaling property, is not kept in (3.2). Observe that the value of s(n) computed by (3.2), is smaller than its "real mathematical value" as computed in (3.1), by factor of $\sqrt{2}$. Since s(n) should be rounded to an integer number, the fact that s(n) is smaller than what it should be, increases the round-off error. In low resolutions, the error is accumulated through the wavelet steps.

If we take the error as a model of "white noise" added to the i-th resolution in a multi-resolution representation of the image, i.e. $X_i$ in FIG. 21, it can be proved that the variance of this noise exponentially increases as a function of i. This "contamination" to the multi-resolution image reduces the coding efficiency at low bit-rates. Let us describe this in detail for the case of the Haar wavelet. We have two assumptions in our analysis:

1. The parity (least significant bit) of an arbitrary coefficient c, in any of the wavelet steps is a uniformly distributed random variable, i.e.

$$Pr(c \equiv 0 \mod 2) = Pr(c \equiv 1 \mod 2) = \frac{1}{2}.$$

2. This parity is independent of the parity of other coefficients (i.e. identically independent distribution).

Our referenced computation, i.e. the accurate computation, is the Haar transform step defined in (3.1). We concentrate on the LL-subband coefficients, because the low-resolution subbands are computed from them. LL-subband coefficients are the result of a 2D-transform step (FIG. 18)

$$ll^{(accurate)}(m,n) = \frac{x(2m+1, 2n+1) + x(2m, 2n+1) + x(2m+1, 2n) + x(2m, 2n)}{2},$$

where m and n are the indices of the row and column of the coefficient respectively.

As described in FIGS. 18, 19 and 20, according to the step defined in (3.2), we first apply the X-direction step $$s(k, n) = \left\lfloor \frac{x(k, 2n+1) + x(k, 2n)}{2} \right\rfloor,$$

for each input row $x(k, \cdot)$.

Under assumption 1 mentioned above, we can write s(k,n) as $$s(k, n) = \frac{x(k, 2n+1) + x(k, 2n)}{2} + e, \quad (3.5)$$

where e is a random variable with a probability density function (PDF) p (·) defined by $$\begin{cases} p(-0.5) = Pr(e = -0.5) = \frac{1}{2}, \\ p(0) = Pr(e = 0) = \frac{1}{2}. \end{cases} \quad (3.6)$$

Therefore, $$E(e) = -\frac{1}{4}, \operatorname{Var}(e) = \frac{1}{16}. \quad (3.7)$$

We then apply the Y-direction transform by $$ll^{(CDSI)}(m, n) = \quad (3.8)$$

$$\left\lfloor \frac{s(2m+1, n) + s(2m, n)}{2} \right\rfloor = \frac{s(2m+1, n) + s(2m, n)}{2} + e'.$$

As in (3.5) we can represent s (2m +1, n) and s (2m, n) by:

$$s(2m+1, n) = \frac{x(2m+1, 2n+1) + x(2m+1, 2n)}{2} + e_1, \quad (3.9)$$

$$s(2m, n) = \frac{x(2m, 2n+1) + x(2m, 2n)}{2} + e_2. \quad (3.10)$$

Now we can write:

$$ll^{(CDSI)}(m, n) = \frac{e_1 + \frac{x(2m+1, 2n+1) + x(2m+1, 2n)}{2} + \frac{x(2m, 2n+1) + x(2m, 2n)}{2} + e_2}{2} + e' \quad (3.11)$$

$$= \frac{x(2m+1, 2n+1) + x(2m+1, 2n) + x(2m, 2n+1) + x(2m, 2n)}{4} + \frac{e_1}{2} + \frac{e_2}{2} + e'$$

$$= \frac{x(2m+1, 2n+1) + x(2m+1, 2n) + x(2m, 2n+1) + x(2m, 2n)}{4} + e$$

where $e_1, e_2, e'$ are independent (assumption 2 above) random variables with expectation $$\frac{1}{4},$$

Variance $$\frac{1}{16},$$

and $$e = \frac{e_1}{2} + \frac{e_2}{2} + e'.$$

Therefore, $$E(e) = \frac{1}{2}E(e_1) + \frac{1}{2}E(e_2) + E(e') = -\frac{1}{2}, \quad (3.12)$$

$$\operatorname{Var}(e) = \operatorname{Var}\left(\frac{e_1}{2} + \frac{e_2}{2} + e'\right)$$

$$= \frac{1}{4}\operatorname{Var}(e_1) + \frac{1}{4}\operatorname{Var}(e_2) + \operatorname{Var}(e')$$

$$= \frac{1}{4} \cdot \frac{1}{16} + \frac{1}{4} \cdot \frac{1}{16} + \frac{1}{16}$$

$$= \frac{3}{32}.$$

Thus, (3.13)

$$ll^{(CDSI)}(m, n) = \frac{ll^{(accurate)}(m, n)}{2} + e.$$

e represents the approximation error of the LL-subband coefficients, results from one 2D transform step. The error relates to the accurate floating-point computation.

This was a description of a single 2D-transform step assuming that the input coefficients are without any error. Now we wish to evaluate the error accumulated after several steps.

At an arbitrary step $i \geq 0$, we can assume that an input coefficient can be written as:

$$x_i(k,l) = x_i^{(accurate)}(k,l) + e_i,$$

where $x_i^{(accurate)}(k,l)$ is the accurate value achieved by floating-point computation for all the previous steps, i.e., a step defined by $$\begin{cases} s(n) = \frac{x(2n+1) + x(2n)}{2}, \\ d(n) = x(2n+1) - x(2n), \end{cases} \quad (3.14)$$

instead of the integer-to-integer computation in (3.2). Observe that if $x_i^{(accurate)}(k,l)$ is the i-th resolution image coefficient, using (3.14) as the 1D Wavelet step, then $$x_i^{(accurate)}(k, l) = \frac{ll_{i-1}^{(accurate)}(k, l)}{2^i}, i \geq 1, \quad (3.15)$$

where $ll_{i-1}^{(accurate)}(k,l)$ is the normalized ($L_2$-norm) LL-subband coefficient resulting from the i-th 2D transform step using (3.1) as the 1D Wavelet step (see Figure ). $e_i$ is the difference between $x_i(k,l)$ and $x_i^{(accurate)}(k,l)$ (I.e., the approximation error of the integer computation made until now). E.g. $e_0 = 0$ ($x_0(k,l)$ is an original image pixel), while $e_i$ is a random number with expectation $-\frac{1}{2}$ and variance $\frac{3}{32}$ (see (3.12)).

Using (3.11), we get:

$$ll_i^{(CDSI)}(m,n) = \frac{x_i^{(acc)}(2m+1, 2n+1) + e_i^1 + x_i^{(acc)}(2m+1, 2n) + e_i^2 + x_i^{(acc)}(2m, 2n+1) + e_i^3 + x_i^{(acc)}(2m, 2n) + e_i^4}{4} + e$$

$$= \frac{x_i^{(acc)}(2m+1, 2n+1) + x_i^{(acc)}(2m+1, 2n) + x_i^{(acc)}(2m, 2n+1) + x_i^{(acc)}(2m, 2n)}{4} + \frac{e_i^1 + e_i^2 + e_i^3 + e_i^4}{4} + e$$

$$= \frac{x_i^{(acc)}(2m+1, 2n+1) + x_i^{(acc)}(2m+1, 2n) + x_i^{(acc)}(2m, 2n+1) + x_i^{(acc)}(2m, 2n)}{4} + e_{i+1}$$

$$= x_{i+1}^{(accurate)} + e_{i+1},$$

where $e_{i+1}$ is defined by $$e_{i+1} = \frac{e_i^1 + e_i^2 + e_i^3 + e_i^4}{4} + e,$$

and corresponds to the $LL_i$ subband.

Consequently $$E(e_{i+1}) = E(e_i) + E(e),$$
$$\text{Var}(e_{i+1}) = \frac{\text{Var}(e_i)}{4} + \text{Var}(e).$$

Observe that $$E(e) = -\frac{1}{2}, \text{Var}(e) = \frac{3}{32}.$$

As a result, we can write recursive formulas for the error expectation and variance after i steps.

$$\begin{cases} E(e_0) = 0, \\ E(e_{i+1}) = E(e_i) - \frac{1}{2}, \end{cases} \quad (3.16)$$

$$\begin{cases} \text{Var}(e_0) = 0, \\ \text{Var}(e_{i+1}) = \frac{\text{Var}(e_i)}{4} + \frac{3}{32}, \end{cases}$$

The explicit solutions to these formulas are $$E(e_i) = -\frac{i}{2}, \text{Var}(e_i) = \frac{1}{8} - \frac{1}{2 \cdot 4^{i+1}}. \quad (3.17)$$

By replacing $x_i^{(accurate)}(m,n)$ with $$\frac{ll_{i-1}^{(accurate)}(m, n)}{2^i}$$

we get $$ll_i^{(CDSI)}(m, n) = \frac{ll_i^{(accurate)}(m, n)}{2^{i+1}} + e_{i+1}. \quad (3.18)$$

Thus, the approximation to $ll_i^{(accurate)}(m, n)$ is $$2^{i+1} ll_i^{(CDSI)}(m,n) = ll_i^{(accurate)}(m,n) + 2^{i+1} e_{i+1}.$$

The approximation error expectation is $$E(2^i e_i) = 2^i E(e_i) = 2^i \left(-\frac{i}{2}\right) = -i 2^{i-1}.$$

The approximation error variance and standard deviation are $$\text{Var}(2^i e_i) = 4^i \text{Var}(e_i) = 4^i \left(\frac{1}{8} - \frac{1}{2 \cdot 4^{i+1}}\right) = \frac{4^i - 1}{8} \approx \frac{4^i}{8} = 2^{2i-3}.$$

Hence $$\text{Std}(2^i e_i) = \sqrt{\text{Var}(2^i e_i)} \approx \frac{2^{i-1}}{\sqrt{2}}.$$

Let us now evaluate the approximation error of the 3 other subbands:

$$lh_i^{(CDSI)}(m, n) = \left\lfloor \frac{ll_{i-1}^{(CDSI)}(2m+1, 2n+1) + ll_{i-1}^{(CDSI)}(2m+1, 2n)}{2} \right\rfloor - \left\lfloor \frac{ll_{i-1}^{(CDSI)}(2m, 2n+1) + ll_{i-1}^{(CDSI)}(2m, 2n)}{2} \right\rfloor$$

$$= \frac{lh_i^{(accurate)}(m, n)}{2^i} + \frac{e_i^1 + e_i^2}{2} + e' - \left(\frac{e_i^3 + e_i^4}{2} + e''\right)$$

$$= \frac{lh_i^{(accurate)}(m, n)}{2^i} + e_i^{LH}$$

where
$e_i^k$ $1 \leq k \leq 4$ are identical to the random variable whose expectation and variance are given in (3.17).

$$e_i^{LH} = \frac{e_i^1 + e_i^2}{2} + e' - \left(\frac{e_i^3 + e_i^4}{2} + e''\right)$$

e' and e" are identical to the random variable whose expectation and variance are given in (3.7).
Thus, $$E(e_i^{LH}) = 0,$$

$$\text{Var}(e_i^{LH}) \approx \frac{1}{4}\left(\frac{1}{8} - \frac{1}{2 \cdot 4^{i+1}} + \frac{1}{8} - \frac{1}{2 \cdot 4^{i+1}}\right) + \frac{1}{16} + \quad (3.19)$$

$$\frac{1}{4}\left(\frac{1}{8} - \frac{1}{2 \cdot 4^{i+1}} + \frac{1}{8} - \frac{1}{2 \cdot 4^{i+1}}\right) + \frac{1}{16} = \frac{1}{4} - \frac{1}{2 \cdot 4^{i+1}}.$$

The approximation to $lh_i^{(accurate)}(m,n)$ is $$2^i lh_i^{(CDSI)}(m,n) = lh_i^{(accurate)}(m,n) + 2^i e_i^{1.11}.$$

The approximation error variance and standard deviation are:

$$\text{Var}(2^i e_i^{LH}) = 4^i \text{Var}(e_i^{LH}) = 4^i \cdot \left(\frac{1}{4} - \frac{1}{2 \cdot 4^{i+1}}\right) = 4^{i-1} - \frac{1}{8} \approx 4^{i-1}.$$

Therefore $$\text{Std}(2^i e_i^{LH}) = \sqrt{\text{Var}(2^i e_i^{LH})} \approx \sqrt{4^{i-1}} = 2^{i-1}.$$

A similar approximation error estimation can be calculated with the HL and HH subbands.

The approximation error evaluation results are summarized in the following table where the error is the difference between the normalized (in $L_2$-norm) coefficients according to Calderbank et al. (referenced supra) reversible transform and the "mathematical" transform (defined in (3.1)).

TABLE 2

Normalized (in $L_2$ - norm) approximation errors of the Wavelet coefficients at resolution $i \geq 0$ ($i = 0$ is the highest resolution) using the (CDSI) reversible Haar transform.

| | Expectation | Variance | Std |
|---|---|---|---|
| $LL_i$ - error | $-(i+1)2^i$ | $\frac{4^{i+1}-1}{8} \approx 2^{2i-1}$ | $0.707 \cdot 2^i$ |
| $LH_i$ - error | 0 | $\frac{2 \cdot 4^i - 1}{8} \approx 4^{i-1}$ | $0.5 \cdot 2^i$ |
| $HL_i$ - error | $-\frac{1}{4} \cdot 2^i$ | $\frac{3 \cdot 4^i - 2}{16} \approx 3 \cdot 4^{i-2}$ | $0.433 \cdot 2^i$ |
| $HH_i$ - error | 0 | $\frac{4^i - 1}{8} \approx 2^{2i-3}$ | $0.354 \cdot 2^i$ |

The above table assumes a low-bit rate transmission where only the coefficients whose absolute value belongs to the range $\lfloor 2^h, 2^{h+1} \rfloor$ are encoded, for every resolution $i$, where $i$ is greater than b (less or more). It is noted that the large error implies a significant loss of coding efficiency.

Instead, we propose a new family of reversible transforms. The proposed family of integer wavelet transforms has all three properties:

1. Reversibility
2. De-correlation
3. Scaling—i.e. improved approximation of the "mathematical" transform.

Our 2D transform step is separable also, but the one-dimensional transform step, which the 2D transform is based on, is different for the X-direction (step 1901), the Y-direction step applied on the low output of the X-direction step (step 2001) and the Y-direction step applied on the high output of the X-direction step (step 2002) as described in FIGS. 18, 19 and 20.

The full 2D Wavelet transform is applied by using the 2D Wavelet transform step iteratively in the classic Mallat decomposition of the image (FIG. 21). See S. Mallat, A wavelet tour of signal processing, Academic Press, 1998, Section 7.7. As previously described, the Wavelet coefficients in the transform of the present invention are all scaled, i.e. normalized in $L_2$-norm as the Wavelet coefficients computed in the accurate "mathematical" transform.

In order to achieve the third property (improved approximation of the "mathematical" transform), we define an extra matrix we call the "Half bit-matrix" which enables the reversibility of the High Y-transform step (step 2002). The elements that belong to this matrix are bits, such that each bit corresponds to an HH-subband coefficient in the following interpretation. Let us describe this by the following example.

Supposing $$s(n)=7, d^{(1)}(n)=9$$

are a coefficient pair resulting from a reversible de-correlated 1D-wavelet step $$\begin{cases} d^{(1)}(n) = x(2n+1) - x(2n), \\ s(n) = \left\lfloor \frac{x(2n) + x(2n+1)}{2} \right\rfloor. \end{cases}$$

Now, $d^{(1)}(n)$ has to be multiplied by $$\frac{1}{2},$$

in order to be scaled.

The binary form of $d(1)(n)=9$ is $$d^{(1)}(n) = 1001_2.$$

If we now divide $d^{(1)}(n)$ by 2 in a floating-point computation we get $$d^{FP}(n) = \frac{1}{2} d^{(1)}(n) = 100.1_2.$$

Let us call the bit, located on the right side of the floating point the "Half Bit". Observe that the Half Bit of $d^{FP}(n)$ is th e LSB of $d^{(1)}(n)$. Therefore, an equivalent way to do this in an integer computation without loosing the Half-Bit is to first calculate the LSB of $d^{(1)}(n)$ by $$\text{HalfBit}(n)=d^{(1)}(n)\bmod 2=9\bmod 2=1,$$

then to shift-write $d^{(1)}(n)$ by $$d(n)=d^{(1)}(n)>>1=1001>>1=100.$$

By saving $d(n)$ and HalfBit$(n)$ we can restore $d^{(1)}(n)$.

In the proposed transform, this Half-bit is needed in the HH-subband coefficient computation. Therefore in our wavelet decomposition for every HH-subband coefficient (in all scales) there is a corresponding bit, which is the coefficient's Half-bit. The Half bit matrix is hidden in the HH-subband in the description of FIGS. 18, 19 and 20. It is described explicitly in the specification of the transform and in the coding algorithm.

We now present our integer-to-integer versions of the Haar transform and the CDF (1,3) transform for the 2-dimensional case.

3.1 Reversible Haar and (CDF) (1,3) Transforms

3.1.1 Haar Transform

With respect to FIG. 19:

3.1.1.1 Step 1901: X-Direction

Forward Step (3.20)

$$\begin{cases} s(n) = \left\lfloor \dfrac{x(2n) + x(2n+1)}{2} \right\rfloor, \\ d(n) = x(2n+1) - x(2n). \end{cases}$$

Inverse Step (3.21)

$$\begin{cases} x(2n) = s(n) - \left\lfloor \dfrac{d(n)}{2} \right\rfloor, \\ x(2n+1) = d(n) + x(2n). \end{cases}$$

With respect to FIG. 20:

3.1.1.2 Step 2001: Y-Direction—Low Forward Step $$\begin{cases} s(n) = x(2n) + x(2n+1), \\ d^{(1)}(n) = \left\lfloor \dfrac{x(2n+1) - x(2n)}{2} \right\rfloor, \\ d(n) = 2d^{(1)}(n). \end{cases} \quad (3.22)$$

Remarks:
1. $s(n)$ is a scaled LL-subband coefficient.
2. $s(n)$ and $d^{(1)}(n)$ are de-correlated and a reversible couple (can be transformed back to $x(2n)$ and $x(2n+1)$), but $d^{(1)}(n)$ is not scaled (it is half its "real value"). Thus, $d^{(1)}(n)$ is multiplied by 2. Nevertheless, the LSB of the LH-subband coefficient $d(n)$ is known to be 0 and not encoded.

Inverse Step $$\begin{cases} x(2n+1) = \dfrac{1}{2}(s(n) + d(n) + (s(n)\bmod 2)), \\ x(2n) = s(n) - x(2n+1). \end{cases} \quad (3.23)$$

With respect to FIG. 20:

3.1.1.3 Step 2002: Y-Direction—High Forward Step $$\begin{cases} d^{(1)}(n) = x(2n+1) - x(2n), \\ \text{HalfBit}(n) = (d^{(1)}(n))\bmod 2, \\ d(n) = \left\lfloor \dfrac{d^{(1)}(n)}{2} \right\rfloor, \\ s(n) = x(2n) + d(n). \end{cases} \quad (3.24)$$

Remark: $d^{(1)}(n)$ and $s(n)$ are de-correlated and reversible couples, but $d^{(1)}(n)$ is not scaled (It is twice its "real value"). Therefore, $d^{(1)}(n)$ is divided by 2. By doing that, we lose its least significant bit, which cannot be restored. To solve this problem, as explained before, we save this bit as the "Half-Bit". Giving this name to that coefficient means that its weight is $$\frac{1}{2}$$

in the "real mathematical scale", and it is the least significant (from the approximation point of view).

Inverse Step $$\begin{cases} x(2n) = s(n) - d(n), \\ d^{(1)}(n) = 2d(n) + \text{HalfBit}(n), \\ x(2n+1) = d^{(1)}(n) + x(2n). \end{cases} \quad (3.25)$$

3.1.2 CDF (1,3) Transform

3.1.2.1 Step 1901: X-Direction

With respect to FIG. 19:

Forward Step

-continued $$\begin{cases} s(n) = \left\lfloor \dfrac{x(2n) + x(2n+1)}{2} \right\rfloor, \\ d^{(1)}(n) = x(2n+1) - x(2n), \\ d(n) = d^{(1)}(n) + \left\lfloor \dfrac{s(n-1) - s(n+1)}{4} \right\rfloor. \end{cases} \quad (3.26)$$

Inverse Step $$\begin{cases} d^{(1)}(n) = d(n) - \left\lfloor \dfrac{s(n-1) - s(n+1)}{4} \right\rfloor, \\ x(2n) = s(n) - \left\lfloor \dfrac{d^{(1)}(n)}{2} \right\rfloor, \\ x(2n+1) = x(2n) + d^{(1)}(n). \end{cases} \quad (3.27)$$

With respect to FIG. 20:

3.1.2.2 Step 2001: Y-direction—Low Forward Step $$\begin{cases} s(n) = x(2n) + x(2n+1), \\ d^{(1)}(n) = \left\lfloor \dfrac{x(2n+1) - x(2n) + \left\lfloor \dfrac{s(n-1) - s(n+1)}{8} \right\rfloor}{2} \right\rfloor, \\ d(n) = 2d^{(1)}(n). \end{cases} \quad (3.28)$$

Remark: See remarks for (3.22).

Inverse Step $$\begin{cases} s^{(1)}(n) = s(n) - \left\lfloor \dfrac{s(n-1) - s(n+1)}{8} \right\rfloor, \\ x(2n+1) = \dfrac{1}{2}(s^{(1)}(n) + d(n) + (s^{(1)}(n) \bmod 2)), \\ x(2n) = s(n) - x(2n+1). \end{cases} \quad (3.29)$$

With respect to FIG. 20:

3.1.2.3 Step 2002: Y-Direction—High Forward Step $$\begin{cases} s(n) = \left\lfloor \dfrac{x(2n) + x(2n+1)}{2} \right\rfloor, \\ d^{(1)}(n) = x(2n+1) - x(2n), \\ d^{(2)}(n) = d^{(1)}(n) + \left\lfloor \dfrac{s(n-1) - s(n+1)}{4} \right\rfloor, \\ d(n) = \left\lfloor \dfrac{d^{(2)}(n)}{2} \right\rfloor, \\ HalfBit(n) = d^{(2)}(n) \bmod 2. \end{cases} \quad (3.30)$$

Inverse Step $$\begin{cases} d^{(1)}(n) = 2d(n) + HalfBit(n) - \left\lfloor \dfrac{s(n-1) - s(n+1)}{4} \right\rfloor, \\ x(2n) = s(n) - \left\lfloor \dfrac{d^{(1)}(n)}{2} \right\rfloor, \\ x(2n+1) = d^{(1)}(n) + x(2n). \end{cases} \quad (3.31)$$

We now compute the approximation error probabilities of our method, and show that it is significantly smaller. We start with the LL-subband error. Assuming $e_i$ is the approximation error of the LL-subband in the i-th resolution (FIG. 21), the LL-subband coefficient in the i-th resolution can be written as:

$$ll_i^{(new)}(m, n) = \left\lfloor \dfrac{x_i^{(new)}(2m+1, 2n+1) + x_i^{(new)}(2m, 2n+1)}{2} \right\rfloor + \left\lfloor \dfrac{x_i^{(new)}(2m+1, 2n) + x_i^{(new)}(2m, 2n)}{2} \right\rfloor = \quad (3.32)$$

$$x_i^{(acc.)}(2m+1, 2n+1) + \dfrac{e_{i-1}^1 + x_i^{(acc.)}(2m, 2n+1) + e_{i-1}^2}{2} + e' +$$

$$\dfrac{x_i^{(acc.)}(2m+1, 2n) + e_{i-1}^3 + x_i^{(acc.)}(2m, 2n) + e_{i-1}^4}{2} +$$

$$e'' = \dfrac{x_i^{(acc.)}(2m+1, 2n+1) + x_i^{(acc.)}(2m, 2n+1) +}{2} + \dfrac{x_i^{(acc.)}(2m+1, 2n) + x_i^{(acc.)}(2m, 2n)}{2} +$$

$$\dfrac{e_{i-1}^1 + e_{i-1}^2 + e_{i-1}^3 + e_{i-1}^4}{2} +$$

$$e' + e'' = ll_i^{(acc.)}(m, n) + e_i,$$

where
- $ll_i^{(new)}(m, n)$ is the new transform LL-subband coefficient (i-th resolution).
- $e_{i-1}^k$ for $1 \leq k \leq 4$, are identical random variable representing the error from the previous level.
- $e'$ and $e''$ are random variables with probability density function (PDF) defined in (3.6).
- $x_i^{(acc.)}(m,n)$ is the i-th resolution image coefficient using (3.1) as the 1D Wavelet step.
- $ll_i^{(acc.)}(m,n)$ is the normalized ($L_2$–norm) LL-subband coefficient resulting from the i-th 2D transform step using (3.1) as the 1D Wavelet step (see FIG. 21).

$$e_i = \dfrac{e_{i-1}^1 + e_{i-1}^2 + e_{i-1}^3 + e_{i-1}^4}{2} + e' + e''.$$

Consequently $$E(e_i) = \dfrac{4E(e_{i-1})}{2} + \left(-\dfrac{1}{4}\right) + \left(-\dfrac{1}{4}\right) = 2E(e_{i-1}) - \dfrac{1}{2}, \quad (3.33)$$

$$\text{Var}(e_i) = \dfrac{4\text{Var}(e_{i-1})}{4} + \dfrac{1}{16} + \dfrac{1}{16} = \text{Var}(e_{i-1}) + \dfrac{1}{8}. \quad (3.34)$$

By knowing that $e_{-1}=0$ we get $$\begin{cases} E(e_i) = \dfrac{1}{2} - 2^i, \\ \text{Var}(e_i) = \dfrac{i+1}{8}. \end{cases} \quad (3.35)$$

Now we can easily evaluate the approximation error of the 3 other subbands:

$$lh_i^{(new)}(m,n) = 2\left[\frac{\left[\frac{x_i^{(new)}(2m+1,2n+1)+x_i^{(new)}(2m,2n+1)}{2}\right] - \left[\frac{x_i^{(new)}(2m+1,2n)+x_i^{(new)}(2m,2n)}{2}\right]}{2}\right] = \quad (3.36)$$

$$\frac{(x_i^{(acc.)}(2m+1,2n+1)+x_i^{(acc.)}(2m,2n+1)) - (x_i^{(acc.)}(2m+1,2n)+x_i^{(acc.)}(2m,2n))}{2} +$$

$$\frac{e_{i-1}^1 + e_{i-1}^2 - e_{i-1}^3 - e_{i-1}^4}{2} + e' -$$

$$e'' + 2e''' = lh_i^{(acc.)}(m,n) + e_i^{LH},$$

where
$lh_i^{(new)}(m,n)$ is the new transform LH-subband coefficient (i-th resolution).
$lh_i^{(accurate)}(m,n)$ is the normalized ($L_2$-norm) LH-subband coefficient resulting from the i-th 2D transform step using (3.1) as the 1D Wavelet step (see FIG. 21).
$e'''$ is a random variable with PDF defined in (3.6).

$$e_i^{LH} = \frac{e_{i-1}^1 + e_{i-1}^2 - e_{i-1}^3 - e_{i-1}^4}{2} + e' - e'' + 2e'''$$

all other symbols are defined like in (3.32).
Hence $$E(e_i^{LH}) = \frac{2E(e_{i-1}) - 2E(e_{i-1})}{2} + \left(-\frac{1}{4}\right) - \left(-\frac{1}{4}\right) + 2 \cdot \left(-\frac{1}{4}\right) = -\frac{1}{2}, \quad (3.37)$$

$$\text{Var}(e_i^{LH}) = \frac{4\text{Var}(e_{i-1})}{4} + \frac{1}{16} + \frac{1}{16} + 4 \cdot \frac{1}{16} = \frac{i+3}{8}. \quad (3.38)$$

Similar estimation can be done for the HL and the HH subbands.

The error estimation (for all subbands) are summarized in the following table where the error is the difference between the normalized (in $L_2$-norm) coefficients according to our new reversible transform and the "mathematical" transform (defined in (3.1)).

TABLE 3

Normalized (in $L_2$ - norm) approximation errors of the Wavelet coefficients at resolution i ≧ 0 (i = 0 is the highest resolution) using the proposed reversible Haar transform. The result for the LL-subband is valid for the proposed reversible (1,3) transform also.

| | Expectation | Variance | Std |
|---|---|---|---|
| $LL_i$ - error | $\frac{1}{2} - 2^i$ | $\frac{i+1}{8}$ | $\sqrt{\frac{i+1}{8}}$ |
| $LH_i$ - error | $-\frac{1}{2}$ | $\frac{i+3}{8}$ | $\sqrt{\frac{i+3}{8}}$ |

TABLE 3-continued

Normalized (in $L_2$ - norm) approximation errors of the Wavelet coefficients at resolution i ≧ 0 (i = 0 is the highest resolution) using the proposed reversible Haar transform. The result for the LL-subband is valid for the proposed reversible (1,3) transform also.

| | Expectation | Variance | Std |
|---|---|---|---|
| $HL_i$ - error | $-\frac{1}{4}$ | $\frac{i}{8} + \frac{1}{16}$ | $\sqrt{\frac{i}{8} + \frac{1}{16}}$ |
| $HH_i$ - error | $-\frac{1}{4}$ | $\frac{i}{8} + \frac{1}{16}$ | $\sqrt{\frac{i}{8} + \frac{1}{16}}$ |

The results indicate that at low bit rates, where only large coefficients are encoded, the error is negligible.

4. Imaging Protocol and Distributed Database

Figure 12:
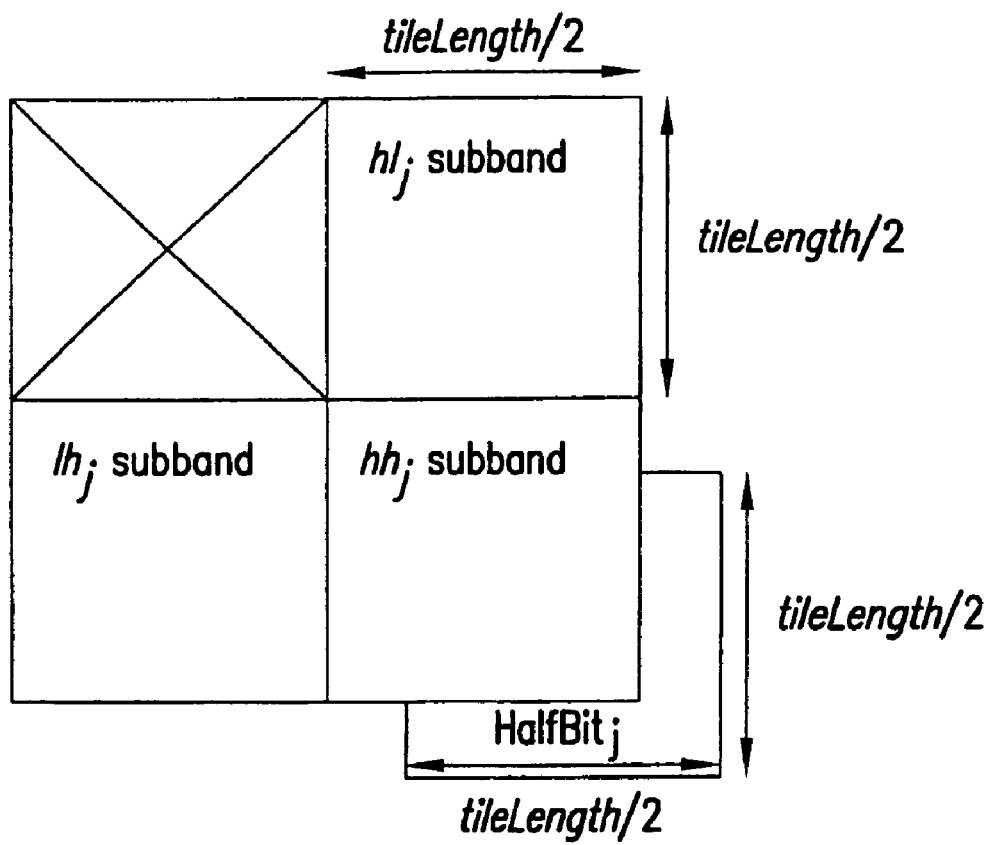
FIG. 12 is a diagram depicting a lossless subband tile wherein the spatial grouping of subband coefficients are at a given resolution and the halfbit matrix is associated with the $hh_j$ subband.

Dividing the Data into Tiles and Bit-Planes:

For the purpose of efficient rendering the coefficients may be sub-divided into tiles. The tiles of this invention differ from previous art as shown in FIG. 12. As in the lossy algorithm, here also the subband tiles are further decomposed to subband data blocks. Each data block of lossless subband tile (FIG. 12) will have a 4D coordinate (t_x, t_y, t_resolution, t_bitPlane)

where 0 ≦ t_bitPlane ≦ maxBitPlane(t_resolution).

Each Data Block Contains the Following Data in Encoded Format:
1. For t_bitPlane ≧ 2:
   a. A list of the indices of all subband coefficients whose absolute value is in the range [$2^{t\_bitPlane-1}, 2^{t\_bitPlane}$).
   b. The sign of all the coefficients of a.
   c. For t_bitPlane>2, an additional precision bit for any coefficient that belongs to the current bit plane or any higher bit plane.
2. For t_bitPlane=1, which we call the "least significant bit plane":
   a. A list of the indices of HL-subband and HH-subband coefficients whose absolute value belongs to the set {−1,0,1}.
   b. A "zero flag" for each coefficient of a, which indicates if the coefficient is equal to zero or not.
   c. The sign of all the coefficients of a, whose "zero flag" is false.
   d. The LSB of the HL-subband and HH-subband coefficients that belong to higher bit plane.

Remark:
Since the LH-subband contains only even coefficients, their LSB must be zero and is not coded.
3. For t_bitplane=0, which we call the "half bit plane", a matrix of $$\left(\frac{tileLength}{2}\right)^2 bits$$

associated with HH-subband coefficients as their last "half bit" (See (3.24) or (3.30)).

5. The Progressive Subband Coding Algorithm

5.1 The Encoding Algorithm

The encoding algorithm of the present invention is performed at the server 120. In the present imaging system this rather time consuming task is performed locally in near real-time for a ROI, and not on the full image. The encoding algorithm is described for images with a single color component, such as grayscale images, but of course may also be applied to images with multiple color components. The straightforward generalization for an arbitrary number of components will be explained later.

The lossless algorithm receive as input the following parameters:

TABLE 4

Lossless Encoding Algorithm Input Parameters

| Variable | Meaning |
|---|---|
| coef | Matrix of subband coefficients, containing $3 \times \left(\frac{\text{tileLength}}{2}\right)^2$ coefficients |
| HalfBit | Matrix of bits containing $\left(\frac{\text{tileLength}}{2}\right)^2$ bits. |

The coding strategy is similar in some sense to that described in A. Said and W. Pearlman, "A new, fast and efficient image codec based on set partitioning", IEEE Trans. Circuits and Systems for video Tech., Vol. 6, No. 3, pp. 243-250, 1996, but the preferred embodiment uses no "Zero Tree" data. For all the data blocks with t_bitplane≧2, we use the lossy encoding algorithm described in previous art with the parameters:

coef:=coef (The lossy parameter coef initialized with the lossless parameter coef)
equalBinSize:=True
$\epsilon_c:=2$ Remark: The lossy algorithm encodes all the bit-plane information for t_bitPlane≧2. For t_bitPlane≦1, i.e. the least significant bit plane (of the lossless algorithm) and the half bit plane, we use a different algorithm described in 5.1.3.

5.1.1 Encoding Algorithm Initialization

The lossless encoding algorithm initialization is the same as the lossy algorithm of § 4.1.1 in the above-cited Ser. No. 09/386,264, now U.S. Pat. No. 6,314,452, which disclosure is incorporated herein by reference. In order to initialize the encoding algorithm, the following procedure is performed:

1. Assign to each coefficient coef (x, y) its bit plane b (x, y) such that:

$$|\text{coef}(x, y)| \in [\epsilon_c 2^h, \epsilon_c 2^{h+1})$$

2. Compute the maximum bit plane over all such coefficients:

$$\text{maxBitPlane}(\text{tile}) = \max_{x,y}(b(x, y))$$

3. Write the value of maxBitPlane(tile) using one byte as the header of the data block:
(t_x, t_y, t_resolution, maxBitPlane (t_resolution))

4. Initialize all the coefficients as members of their corresponding Type 16 group.

5. Initialize a list of significant coefficients to be empty.

6. Initialize a coefficient approximation matrix $$\tilde{\text{coef}}$$

as zero.

5.1.2 The Outer Loop

The outer loop of the encoding algorithm scans the bit planes from b=maxBitPlane(tile) to b=0. The output of each such bit plane scan is the subband data block. Since the last stage of the encoding algorithm is arithmetic encoding of given symbols, at the beginning of each scan the arithmetic encoding output module is redirected to the storage area allocated for the particular data block. Once the bit plane scan is finished and the data block has been encoded, the output stream is closed and the bit plane b is decremented. After the outer loop is finished the following stages are performed:

1. Least significant bit plane is encoded (t_bitPlane=1).
2. Half bit plane is encoded (t_bitPlane=0).

The output of the least significant bit plane scan is the data block (FIG. 14):
(t_x, t_y, t_resolution, t_bitPlane=1).
The half bit plane data block is:
(t_x, t_y, t_resolution, t_bitPlane=0).

5.1.3 Bit-Plane Scan

Figure 24:
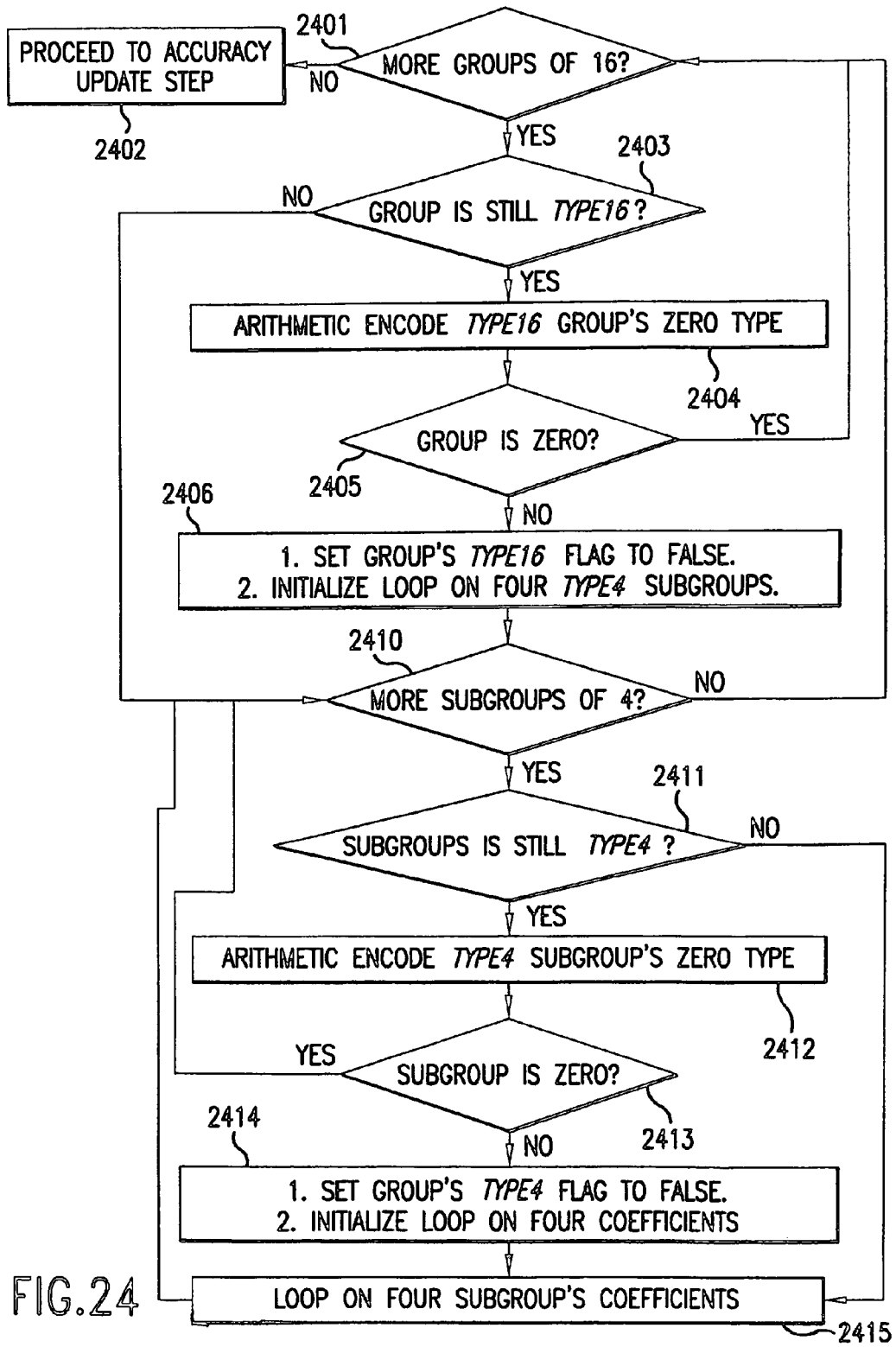
FIG. 24 is a flow diagram describing a bit plane significance scan of the server-encoding algorithm.

For t_bitPlane≧2, the framework of the bit plane scan is described in FIG. 24, while the pseudo code is given in the above-cited Ser. No. 09/386,264, now U.S. Pat. No. 6,314,452, which disclosure is incorporated herein by reference. The scan, for a given level b (b≧2), encodes all of the coefficients' data corresponding to the absolute value interval $[2^{h-}, 2^h)$ Remark: The encoder method isLastBitPlane( ) is associated to the t_bitPlane=2.

Figure 22:
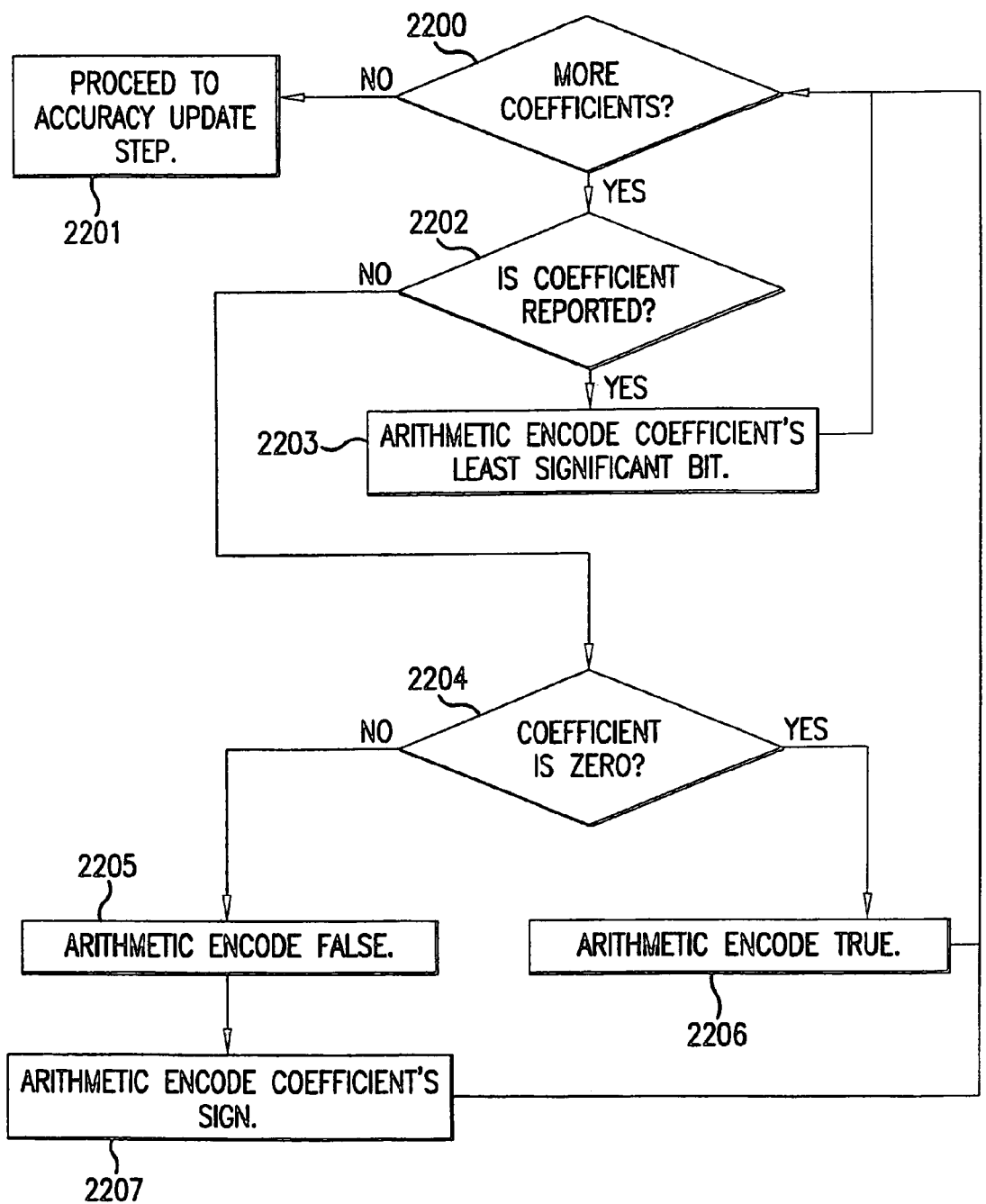
FIG. 22 is a flow diagram representing the least significant bit plane scan of the encoding algorithm.
Figure 23:
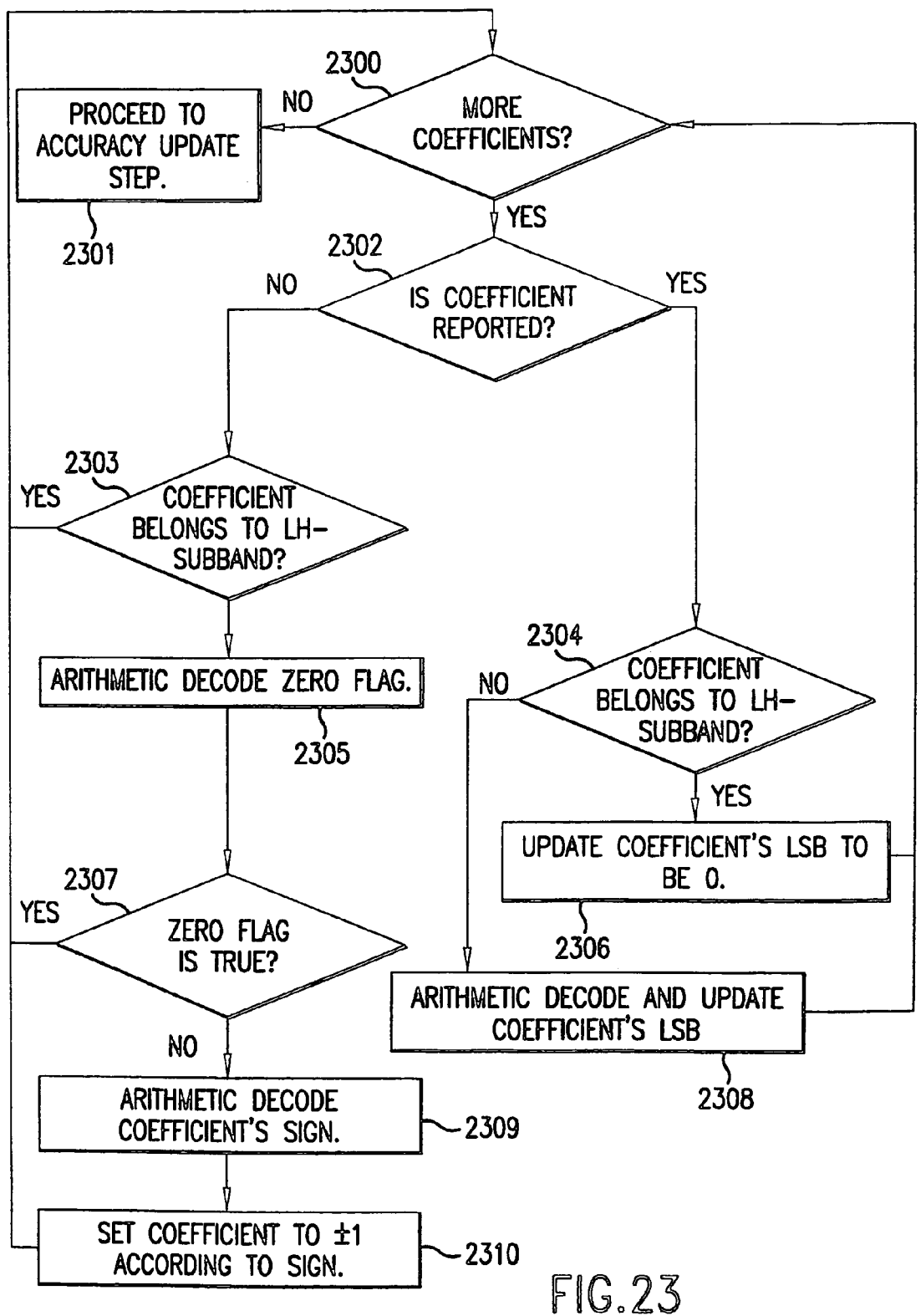
FIG. 23 is a flow diagram representing the least significant bit plane scan of the decoding algorithm.

For the least significant bit plane, a pseudo code is described in FIG. 15, while a flow chart is described in FIG. 22.

Figure 14:
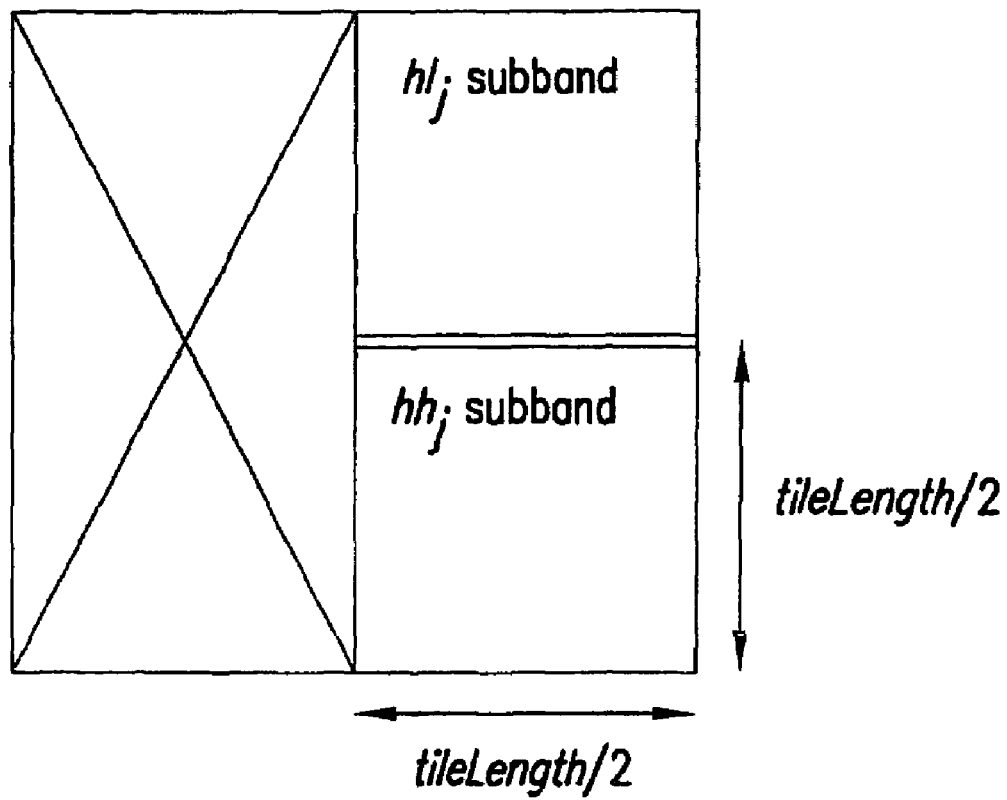
FIG. 14 a diagram depicting a lossless last bit plane data block in which only hl and hh subband coefficients are scanned.

Regarding the least significant bit encoding algorithm, the following is noted:

1. The coefficients scanning procedure, i.e. moreCoef( ) procedure in FIG. 15 or "More coefficients?" in FIG. 22 includes all the coefficients belong to the HH and the HL-subband (FIG. 14). The LH-subband is skipped, since the least significant bit of each coefficient in it is zero (see remark 2 for (3.22)).
2. The procedure isCoefReporeted( ) ("Is coefficient reported?" in the flow chart) returns false if the coefficient is one of {−1,1}, i.e. in all higher bit plane scans it was insignificant, otherwise it returns true.
3. The procedure isCoefExactZero( ) ("Coefficient is zero?" in the flow chart) returns true iff the coefficient is zero.
4. The procedure getCoefSign() returns the coefficient's sign.

For the half bit plane, a pseudo code is described in FIG. 16.

5.2 The Decoding Algorithm

Obviously, this algorithm is a reversed step of the encoding algorithm of section 5.1, performed in the server 120. The client computer 110 during the progressive rendering operation performs the decoding algorithm. Similar to the encoding algorithm, the decoding algorithm is described for an image with one component (such as a grayscale image), but of course could also be used with an image with more than one component. The input parameters to the lossless algorithm are given below:

TABLE 5

Lossless decoding algorithm input parameters

| Variable | Meaning |
|---|---|
| $\Box$ coef | Empty matrix of subband coefficients to be filled by the decoding algorithm. |
| HalfBit | Matrix of bits containing $\left(\frac{tileLength}{2}\right)^2$ bits. |

For all the data blocks with t_bitPlane≧2, a "lossy" decoding algorithm is utilized. The input parameters for the lossy algorithm are:

$$\widehat{coef} := \widehat{coef}$$

$$equalBinSize := True$$

$$\varepsilon_c := 2$$

5.2.1 Decoding Algorithm Initialization

1. Assign the value zero to each coefficient $$\widehat{coef}(x, y).$$

2. Assign the value zero to each bit belongs to the HalfBit matrix.
3. Initialize all the coefficients as members of their corresponding Type 16 group.
4. Initialize the list of significant coefficients to be empty.
5. If the "first" data block (t_x, t$_{13}$ y, t_resolution, maxBitPlane(t_resolution)) is available at the client, read the first byte, which is the value of maxBitPlane(tile).

5.2.2 The Outer Loop

Upon the completion of the outer loop in 5.1.2 the following stages are preformed:

1. The decoding algorithm scans the least significant bit plane. The input to this stage is encoded data block (t_x, t_y, t_resolution, LeastSiginificant_bitPlane).
2. The decoding algorithm scans the half bit plane. The input to this stage is encoded data block (t_x, t_y, t_resolution, Half_bitPlane).

5.2.3 Bit Plane Scan

The preferred embodiment follows the lossy prior art of the above-cited Ser. No. 09/386,264, now U.S. Pat. No. 6,314,452, which disclosure is incorporated herein by reference, for t_bitPlane≧2. The scan, for a given level b, decodes all of the coefficients' data corresponding to the absolute value interval $[\varepsilon 2^h, \varepsilon 2^{h+1})$.

Pseudo codes of the least significant bit plane scan and half bit plane scan are described in FIG. 16. Regarding the pseudo code, the following is noted:

1. The decoder method moreCoef( ) scans all the coefficients in the HH, HL and LH subband. But, since the LH-subband is skipped in the encoding algorithm, decodeSymbol( ) is not called for its coefficients. Instead, their least significant bit is initialized to zero.
2. Recall that LH-subband coefficients that have not been reported until the least significant bit-plane must be zero since they are known to be even.

6. Client Workflow

Figure 4:
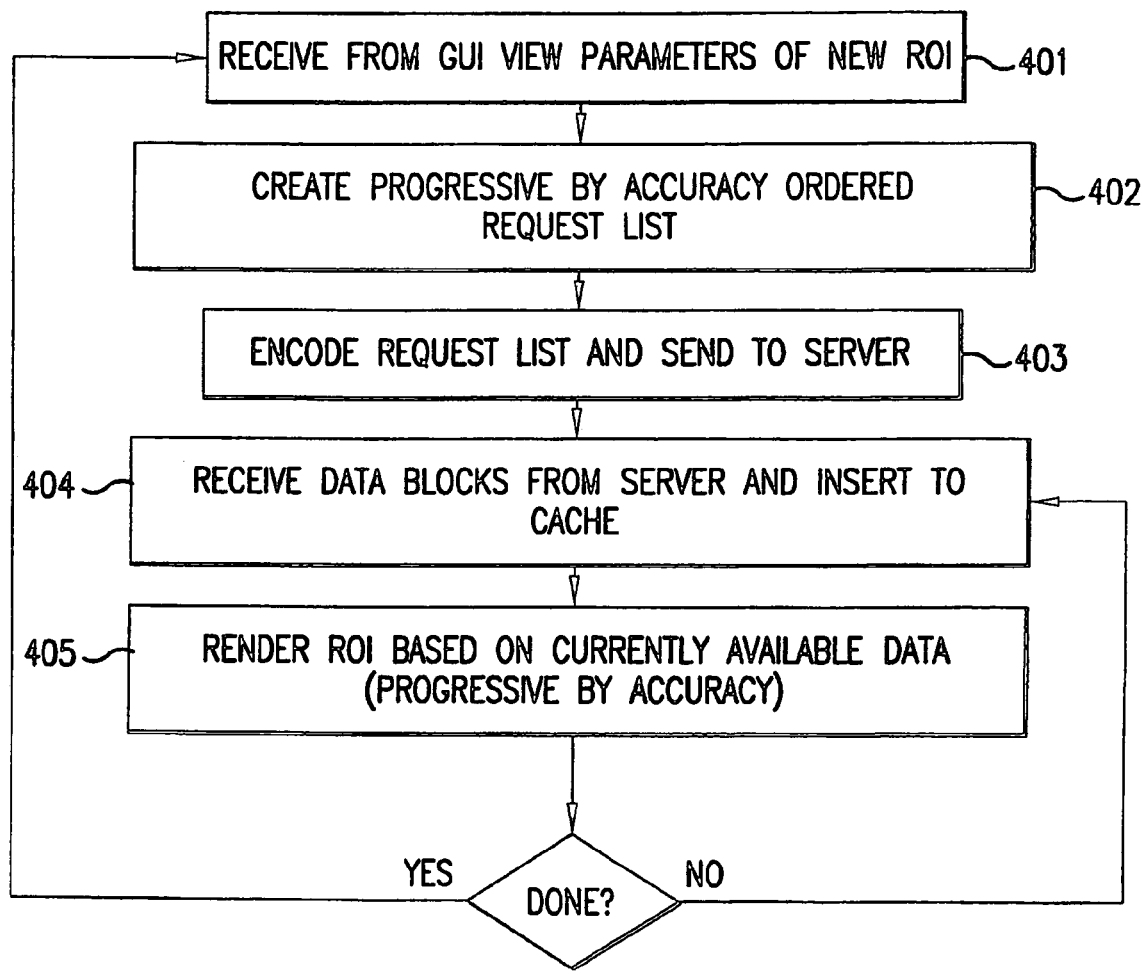
FIG. 4 is a diagram depicting the client "progressive by accuracy" workflow.

With reference to FIG. 4, we describe the workflow at the client unit 110. Any new ROI generated by the user's action such as a zoom-in, a scroll, or a luminance tuning invokes in step 401 a call from the GUI interface to the client imaging module with the new ROI view parameters. The client imaging module then computes in step 402 which data blocks are required for the rendering of the ROI and checks if these data blocks are available in the client cache. If not, their coordinate is added to a request list ordered according to some progressive mode. The request list is then encoded in step 403 and sent to the server. The server responds to the request by sending back to the client a stream of data blocks, in the order in which they were requested. In step 404 the client inserts them to their appropriate location in the distributed database. At various points in time step 405, a rendering of the ROI, is invoked. Naturally, the rendering operation is progressive and is able to use only the currently available data in the client's database.

6.1 Step 401: Receiving the ROI Parameters

The imaging module on the client computer 120 receives from the GUI interface module view parameters detailed in Table 6. These parameters are used to generate a request list for the ROI. The same parameters are used to render the ROI.

TABLE 6

| Variable | Meaning |
|---|---|
| worldPolygon | A 2D polygon in the original image coordinate system |
| scale | The view resolution. 0 < scale < 1 implies a low view resolution, scale = 1 original resolution and scale > 1 a higher than original view resolution |
| deviceDepth | A number in the set {8, 16, 24} representing the depth of the output device (screen, printer) |
| viewQuality | A quality factor in the range [1, 7] where 1 implies very low quality and 7 implies lossless quality |
| luminanceMap | If active: a curve defining a mapping of medical images with more than 8 bits (typically 10, 12, 16 bits) per grayscale values to an 8 bit screen |
| progressiveMode | One of: Progressive By Accuracy, Progressive By Resolution, Progressive by Spatial Order |

The basic parameters of a ROI are worldPolygon and scale which determine uniquely the ROI view. If the ROI is to be rendered onto a viewing device with limited resolution, then a worldPolygon containing a large portion of the image will be coupled by a small scale. In the case where the rendering is done by a printer, the ROI could be a strip of a proof resolution of the original image that has arrived from the server computer 120. This strip is rendered in parallel to the transmission, such that the printing process will terminate with the end of transmission. The other view parameters determine the way in which the view will be rendered. The parameters deviceDepth and viewQuality determine the quality of the rendering operation. In cases where the viewing device is of low resolution or the user sets the quality parameter to a lower quality, the transfer size can be reduced significantly.

The parameter luminanceMap is typically used in medical imaging for grayscale images that are of higher resolution than the viewing device. Typically, screens display grayscale images using 8 bits, while medical images sometimes represent each pixel using 16 bits. Thus, it is necessary to map the bigger pixel range to the smaller range of [0,255].

Lastly, the parameter progressiveMode determines the order in which data blocks should be transmitted from the server 120. The "Progressive By Accuracy" mode is the best mode for viewing in low bandwidth environments. "gressive By Resolution" mode is easier to implement since it does not require the more sophisticated accuracy (bit plane) management and therefore is commonly found in other systems. The superiority of the "progressive by accuracy" mode can be mathematically proven by showing the superiority of "non-linear approximation" over "linear approximation" for the class of real-life images. See, e.g., R. A. DeVore, "Nonlinear approximation", Acta Numerica, pp. 51-150, 1998.

The "Progressive by Spatial Order" mode is designed, for example, for a "print on demand" feature where the ROI is actually a low resolution "proof print" of a high resolution graphic art work. In this mode the image data is ordered and received in a top to bottom order, such that printing can be done in parallel to the transmission.

Since lossless compression is frequently required in medical images transmission, where typically more than 8 bits images are used, the curve (luminanceMap hereinabove) which defines the mapping from the original image gray scale range (typically 10,12,16 bits) to an 8-bit screen is discussed in more detail. Furthermore, in viewing medical images, regardless of the original image depth, mapping is required in order to control the brightness and contrast of the image.

6.1.1 Luminance Mapping

Mapping from original image depth (e.g. 10,12,16 bits) to screen depth (typically 8-bits), is defined by a monotonic function (FIG. 17):

$$f[0, 2^{original\_image\_depth} - 1] \rightarrow [0, 2^{screen\_depth} - 1] \qquad (6.1)$$

Figure 17:
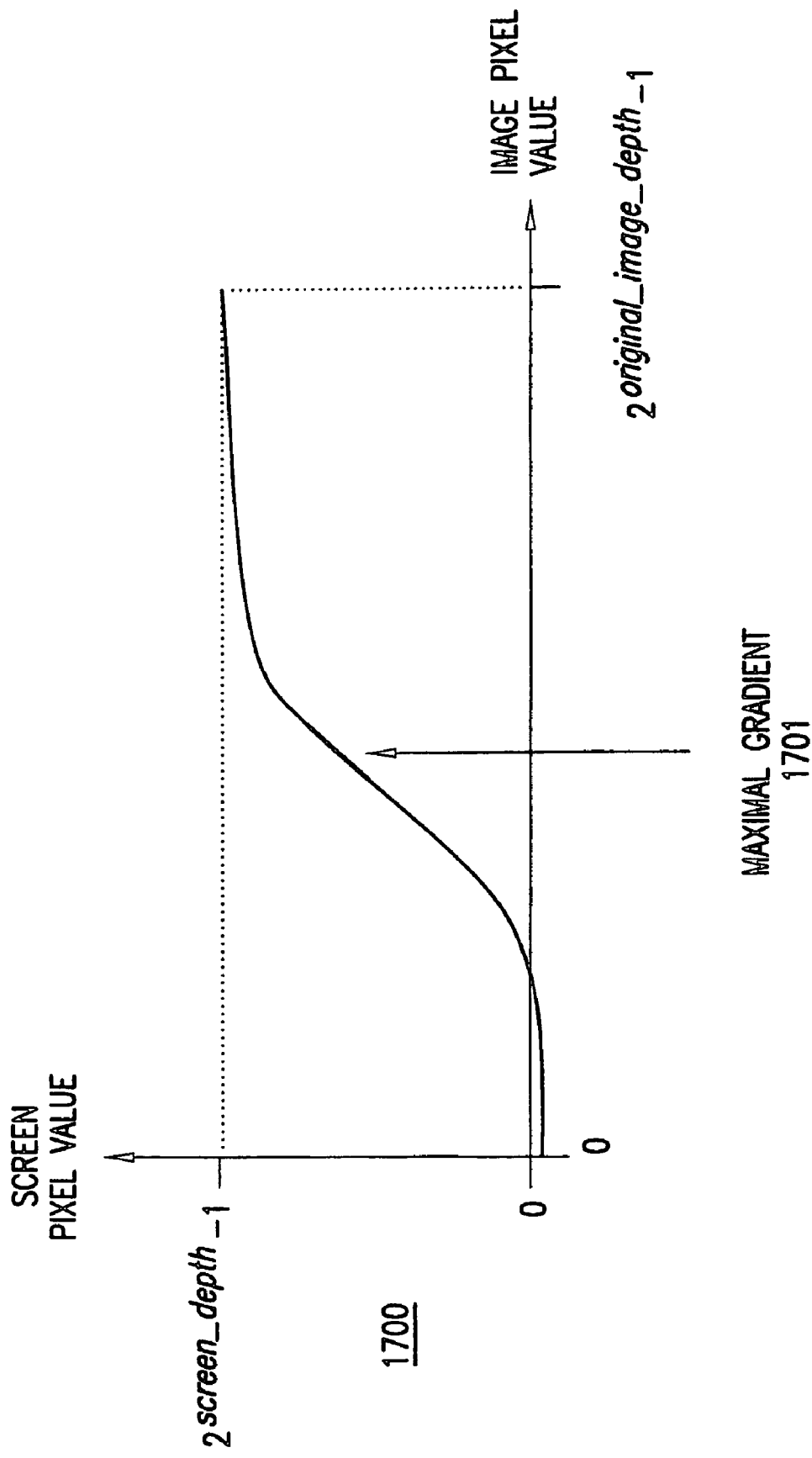
FIG. 17 is a diagram depicting the curve defining the mapping from Original_Image_Depth-bit image to Screen_Depth-bit.

The curve influences not only the mapping, i.e. the drawing to the screen, but also the request from the server. To understand this, let us focus on in the maximal gradient of the curve (FIG. 17). In a lossy mode, the request is created such that the image approximation on the client side is close enough to the original image, i.e., the RMS (Root Mean Square Error) is visually negligible. When a curve (i.e. mapping function) is applied, the RMS can be increased or reduced. The maximal RMS increasing factor depends on the maximal gradient of the curve as follows:

$$\text{RMS\_increasing\_factor} = \frac{\text{RMS}(f(I), f(\hat{I}))}{\text{RMS}(I, \hat{I})} \leq \max(f'), \qquad (6.2)$$

where
- I is the original image
- $\hat{I}$ is the approximated image
- f is the mapping function $$\text{RMS}(I_1, I_2) = \frac{\|I_1 - I_2\|_{l_2}}{\text{Image\_size}}$$

max (f') is the maximal gradient of the curve.

We consider the worst case of the RMS increasing factor i.e.:

RMS_increasing_factor=Maximal_gradient=max (f')

If the RMS increasing factor is greater than 1, it means that the "new RMS" may be greater than we consider as visually negligible error. Thus, the request list should be increased (i.e. more bit-planes should be requested from the server) in order to improve the approximation accuracy. Conversely, if the RMS increasing factor is smaller than 1, the request listing should be reduced. The exact specification of this is given in the following section.

6.2 Step 402: Creating the Request List

In step 402 using the ROI view parameters, the client imaging module at the client computer 110 calculates the data block request list ordered according to the particular progressiveMode selected. Given the parameters worldPolygon and Scale, it may be determined which subband tiles in the "frequency domain" participate in the reconstruction of the ROI in the "time domain". These tiles contain all the coefficients that are required for an "Inverse Subband/Wavelet Transform" (IWT) step that produces the ROI. First, the parameter dyadicResolution (ROI) is computed, which is the lowest possible dyadic resolution higher than the resolution of the ROI. Any subband tiles of a higher resolution than dyadicResolution (ROI) do not participate in the rendering operation. Their associated data blocks are therefore not requested, since they are visually insignificant for the rendering of the ROI. If scale≧1, then the highest resolution subband tiles are required. If scale≦$2^{1-number(\ )Resolutions}$ then only the lowest resolution tile is required. For any other value of scale we perform the mapping described below in Table 7.

TABLE 7

| scale | highestSubbandResolution |
|---|---|
| scale ≦ $2^{1-numberOfResolutions}$ | 1 |
| $2^{1-numberOfResolutions}$ < scale ≦ 1 | numberOfResolutions − ⌊ −log$_2$ (scale) ⌋ |
| scale > 1 | numberOfResolutions |

Figure 3:
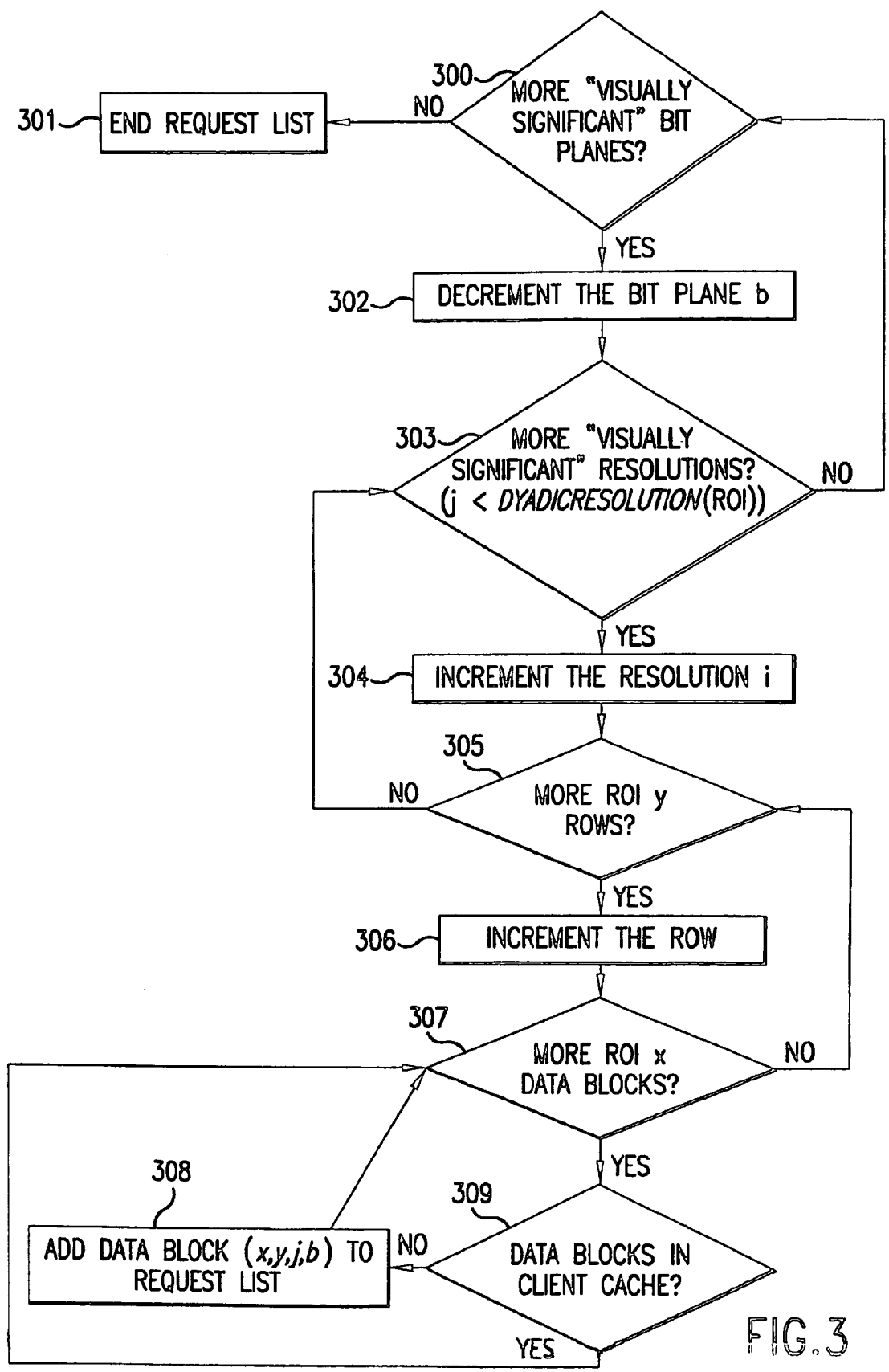
FIG. 3 is a flow diagram representing a "lossless progressive by accuracy" request list for a ROI.

Once it has been determined which subband tiles participate in the rendering of the ROI, it is necessary to find which of their data blocks are visually significant and in what order they should be requested. Using well known rate/distortion rules from the field of image coding (such as is described in S. Mallat and F. Falzon, "Understanding image transform codes", Proc. SPIE Aerospace Conf., 1997), an optimal order can be determined in which the data blocks should be ordered by the client imaging module (and thus delivered by the server 120). This optimal order is described in steps 301-310 of FIG. 3 for the "Progressive By Accuracy" mode. The underlying mathematical principal behind this approach is "Non-Linear Approximation".

First, the subband coefficients with largest absolute values are requested since they represent the most visually significant data such as strong edges in the image. Note that high resolution coefficients with large absolute values are requested before low resolution coefficients with smaller absolute values. Within each given layer of precision (bit plane) the order of request is according to resolution; low resolution coefficients are requested first and the coefficients of highestSubbandResolution are requested last.

The main difficulty of this step is this: Assume a subband tile is required for the rendering of the ROI. This means that t_resolution≦dyadicResolution (ROI) and the tile is required in the IWT procedure that reconstructs the ROI. It must be understood which of the data blocks associated with the subband tile represent visually insignificant data and thus should not be requested. Sending all of the associated data blocks will not affect the quality of the progressive rendering. However, in many cases transmitting the "tail" of data blocks associated with high precision is unnecessary since it will be visually insignificant. In such a case, the user will see that the transmission of the ROI from the server 120 is still in progress, yet the progressive rendering of the ROI no longer changes the displayed image.

Additionally, the influence of the luminance mapping on the accuracy level of the requested data block is described below. Supposing for some t_x, t_y and t_resolution, the set $$\{(t\_x, t\_y, t\_resolution, t\_bitplane) \mid T \leq t\_bitPlane \leq maxPlaneBit(t\_resolution)\}$$

is requested where T is the minimal bit plane required to the current view. Here, where the luminance mapping is taken into account, the value of T might be increased or decreased.

The number of bit planes reduced (added) from the request list is $$\left\lfloor \log_2\left(\frac{1}{\text{Maximal\_gradient}}\right) \right\rfloor.$$

I.e., for those t_x, t_y and t_resolution mentioned before, the following set is requested:

$$\{(t\_x, t\_y, t\_resolution, t\_bitPlane) \mid T' \leq t\_bitPlane \leq maxPlaneBit(t\_resolution)\}$$

where $$T' = T + \left\lfloor \log_2\left(\frac{1}{\text{Maximal\_gradient}}\right) \right\rfloor.$$

EXAMPLES

1. Given
Image depth of 12-bits
Screen depth of 8-bits
Linear luminance mapping, i.e., $$\text{Maximal gradient} = \frac{2^8}{2^{12}} = 2^{-4}.$$

The number of bit planes reduced from the request list is:

$$\left\lfloor \log_2\left(\frac{1}{\text{Maximal gradient}}\right) \right\rfloor = \left\lfloor \log_2\left(\frac{1}{2^{-4}}\right) \right\rfloor = 4.$$

2. Given a luminance mapping with Maximal gradient=2
The number of bit planes reduced from the request list is:

$$\left\lfloor \log_2\left(\frac{1}{\text{Maximal gradient}}\right) \right\rfloor = \left\lfloor \log_2\left(\frac{1}{2}\right) \right\rfloor = -1.$$

Thus, one bit plane is added to the original set.

6.3 Step 403: Encoding the Request List

The client imaging module in the client computer 110 encodes the request list into a request stream that is sent to the server computer 120 via the communication network 130 (FIG. 1). The request list encoding algorithm is a simple rectangle-based procedure. The heuristics of the algorithm is that the requested data block usually can be grouped into data block rectangles. From the request list of data blocks indexed by the encoding algorithm computes structures of the type $$\{(t\_x, t\_y, t\_resolution, t\_bitplane), n_x, n_y\}, n_x, n_y \geq 1 \quad (1.3)$$

Each such structure represents the $n_x \times n_y$ data blocks $$\{(t\_x+i, t\_y+j, t\_resolution, t\_bitPlane)\}, 0 \leq i < n_x, 0 \leq j < n_y.$$

The encoding algorithm attempts to create the shortest possible list of structures, collecting the data blocks to the largest possible rectangles can achieve this. It is important to note that the algorithm insures that the order of data blocks in the request list is not changed, since the server 120 will respond to the request stream by transmitting data blocks in the order in which they were requested. A good example of when this works well is when a user zooms in into a ROI at a high resolution that was never viewed before. In such a case the request list might be composed of hundreds of requested data blocks, but they will be collected to one (x,y) rectangle for each pair (t_resolution, t_bitPlane).

6.4 Step 404: Receiving the Data Blocks

The client computer 110 upon receiving an encoded stream containing data blocks from the server computer 120, decodes the stream and inserts the data blocks into their appropriate location in the distributed database using their ID as a key. The simple decoding algorithm performed here is a reversed step of the encoding scheme described infra. Since the client 110 is aware of the order of the data blocks in the encoded stream, only the size of each data block need be reported along with the actual data. In case the server 120 indicates an empty data block, the receiving module marks the appropriate slot in the database as existing but empty.

Recall that the subband tile associated with each data block is denoted by the first three coordinates of the four coordinates of a data block (t_x,t_y,t_resolution). From the subband tile's coordinates the dimensions are calculated of the area of visual significance; that is, the portion of the ROI that is affected by the subband tile. Assume that each subband tile is of length tileLength and that the wavelet basis used has a maximal filter size maxFilterSize, then defining hFilterSize:=⌈maxFilterSize/2⌉ and factor:=numberOfResolutions−t_resolution+1, we have that the dimensions of the affected region of the ROI (in the original image's coordinate system) are $$[t\_x \times tilelength^{factor} - hFilterSize^{factor}, (t\_x+1) \times tileLength^{factor} + hFilterSize^{factor}] \times [t\_y \times tilelength^{factor} - hFilterSize^{factor}, (t\_y+1) \times tilelength^{factor} + hFilterSize^{factor}]$$

These dimensions are merged into the next rendering operation's region. The rendering region is used to efficiently render only the updated portion of the ROI.

6.5 Progressive Rendering

During the transmission of ROI data from the server to the client, the client performs rendering operations of the ROI. To ensure that these rendering tasks do not interrupt the transfer, the client runs two program threads: communications and rendering. The rendering thread runs in the background and uses a pre-allocated "off-screen" buffer. Only then does the client use device and system dependant tools to output the visual information from the "off-screen" to the rendering device such as the screen or printer.

The rendering algorithm performs reconstruction of the ROI at the highest possible quality based on the available data at the client. That is, data that was previously cached or data that "just" arrived from the server. For efficiency, the progressive rendering is performed only for the portion of the ROI that is affected by newly arrived data. Specifically, data that arrived after the previous rendering task began. This "updated region" is obtained using the method of step 404 described in §6.4.

The parameters of the rendering algorithm are composed of two sets:

1. The ROI parameters described in Table 6.
2. The parameters transmitted from the server explained in Table 8, with the exception of the jumpSize parameter, which is a "server only" parameter.

The rendering algorithm computes pixels at the dyadic resolution dyadicResolution(ROI). Recall that this is the lowest possible dyadic resolution that is higher than the resolution of the ROI. The obtained image is then resized to the correct resolution. Using a tiling of the multiresolution representation of the ROI, the steps of the algorithm are performed on a tile by tile basis as described in FIG. 1. Since the tiles' length are tileLength, which is typically chosen as 64, the rendering algorithm is memory efficient.

6.5.1 The Rendering Rate

As ROI data is transmitted to the client 110, the rendering algorithm is performed at certain time intervals of a few seconds. At each point in time, only one rendering task is performed for any given displayed image. To ensure that progressive rendering does not become a bottleneck, two rates are measured: the data block transfer rate and the ROI rendering speed. If it is predicted that the transfer will be finished before a rendering task, a small delay is inserted, such that rendering will be performed after all the data arrives. Therefore, in a slow network scenario (as the Internet often is), for almost the entire progressive rendering tasks, no delay is inserted. With the arrival of every few kilobytes of data, containing the information of a few data blocks, a rendering task visualizes the ROI at the best possible quality. In such a case the user is aware that the bottleneck of the ROI rendering is the slow network and has the option to accept the current rendering as a good enough approximation of the image and not wait for all the data to arrive.

6.5.2 Memory Constraint Subband Data Structure

This data-structure is required to efficiently store subband coefficients, in memory, during the rendering algorithm. This is required since the coefficients are represented in either long integer precision (i.e. lossless coding mode) or floating-point precision (i.e. lossy coding mode) which typically requires more memory than pixel representation (1 byte). In lossy mode, the coefficients at the client side 110 are represented using floating-point representation, even if they were computed at the server side 120 using an integer implementation. This minimizes round-off errors.

At the beginning of the rendering algorithm, coefficient and pixel memory strips are initialized. dyadicWidth(ROI) may be denoted as the width of the projection of the ROI onto the resolution dyadicResolution (ROI). For each component and resolution 1<j≦dyadic Resolution (ROI), four subband strips are allocated for the four types of subband coefficients: hl, lh, hh and Halfbit. The coefficient strips are allocated with dimensions $$\left[ 2^{j-\text{dyadicResolution}(ROI)-1} \times \text{dyadicWidth}(ROI), \frac{3}{2} \times \text{tileLength} + \frac{\text{maxFilterSize}}{2} \right]$$

For each component and resolution 1≦j<dyadicResolution a pixel strip is allocated with dimensions $$\left[ 2^{j-\text{dyadicResolution}(ROI)} \times \text{dyadicWidth}(ROI), \text{tileLength} + \frac{\text{maxFilterSize}}{2} \right]$$

Figure 10:
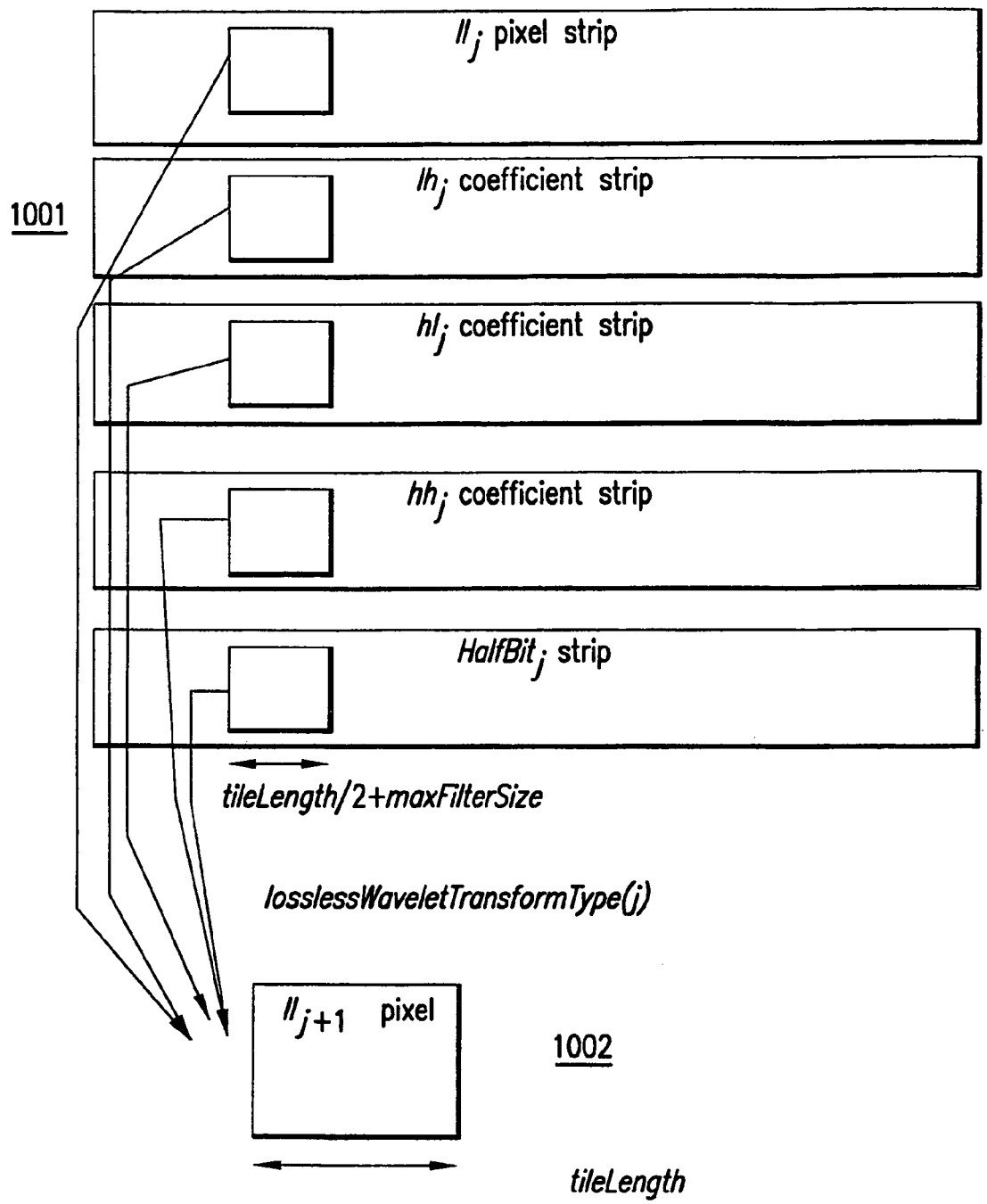
FIG. 10 is a diagram depicting the local inverse lossless wavelet transform.
Figure 11:
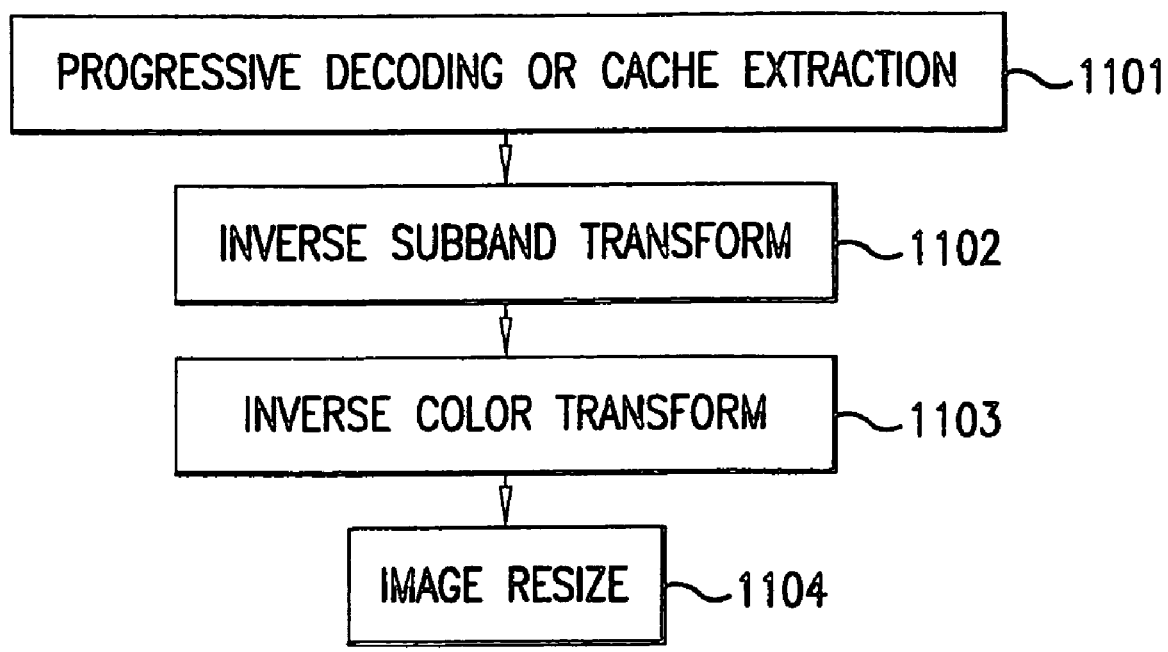
FIG. 11 is a diagram depicting the progressive rendering steps.

Beginning with the lowest resolution 1, the algorithm proceeds with recursive multiresolution processing from the top of the ROI to bottom (i.e. y direction). Referring to FIGS. 10 and 11, in step 1101, the multiresolution strips are filled with sub-tiles of coefficients 1050 decoded from the database or read from the memory cache. Multiresolution pixels 1051 are obtained from the coefficients using an inverse subband transform step 1102 (shown in further detail in FIG. 10). Each time a tile of pixels at resolutions j<dyadicResolution (ROI) is reconstructed, it is written into the pixel strip at the resolution j. Each time a tile of pixels at the highest resolution dyadicResolution (ROI) is reconstructed, it is input to the inverse color transform and resizing steps 1103, 1104.

6.5.3 Step 1101: Decoding and Memory Caching

Figure 25:
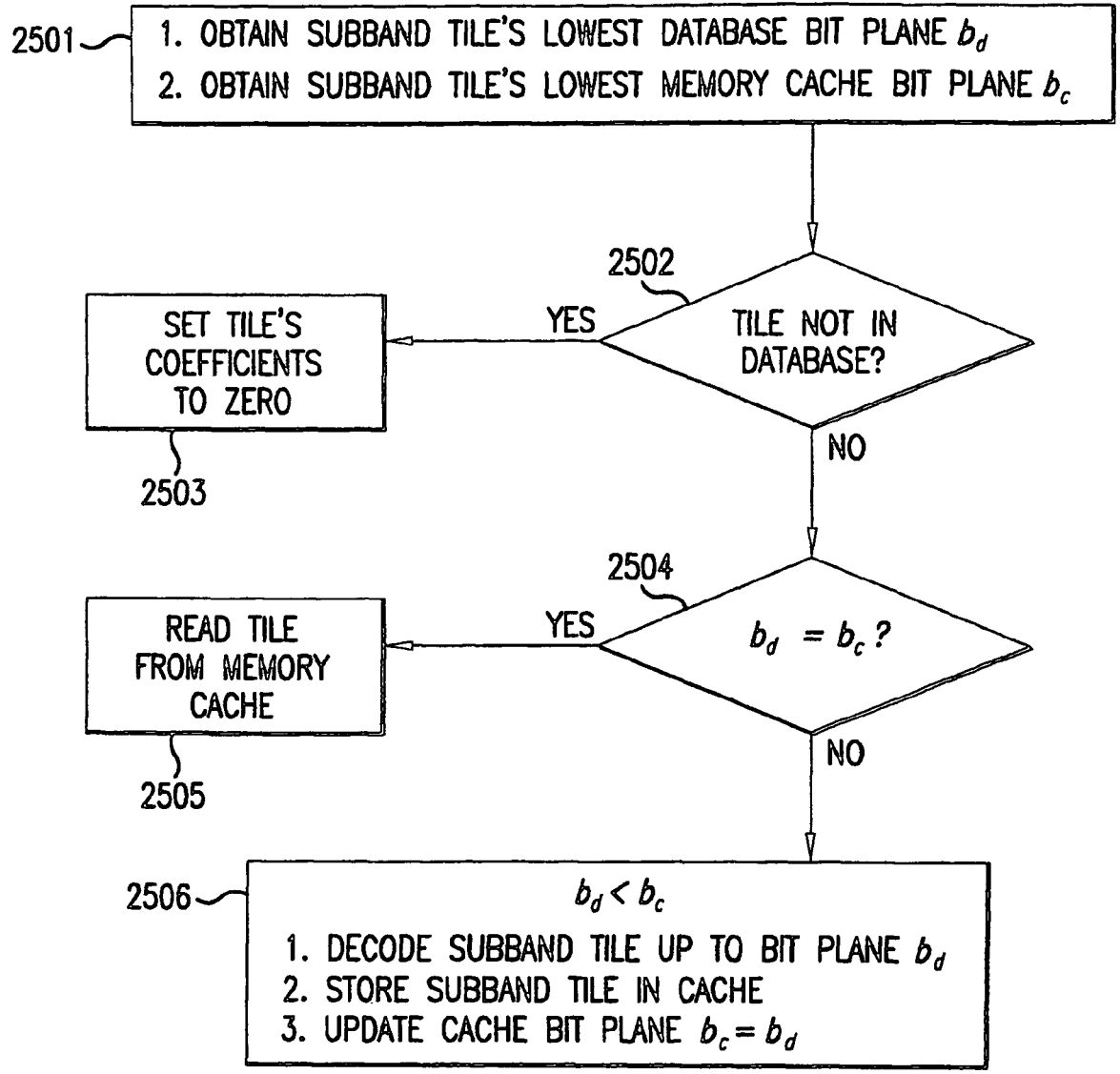
FIG. 25 is a flow diagram describing the subband tile extraction of the client progressive rendering process.

The subband coefficients data structure described previously in section 6.5.2 is filled on a tile basis. Each such subband tile is obtained by decoding the corresponding data blocks stored in the database or by reading them from the memory cache. The memory cache is used to store coefficients in a simple encoded format. The motivation is this: the decoding algorithm described previously in section 5.2 is computationally intensive and thus should be avoided whenever possible. To this end the rendering module uses a memory cache 111 where subband coefficients are stored in a very simple encoded format which can be decoded very quickly. For each required subband tile, the following extraction procedure is performed, described in FIG. 25, beginning at step 2501. In step 2502, if no data blocks are available in the database for the subband tile, its coefficients are set to zero (step 2503). In step 2504, if the tile's memory cache storage is updated, namely it stores coefficients in the same precision as in the database, then the coefficients can be efficiently read from there (step 2505). In step 2506, the last possibility is that the database holds the subband tile in higher precision. Then, the tile is decoded down to the lowest available bit plane using the algorithm previously described in section 5.2 and the cached representation is replaced with a representation of this higher precision information.

6.5.4 Step 1102: Inverse Lossless Wavelet Transform

This is an inverse step to step 603 performed in the server (see section 7.1.5). Following FIG. 21 we see that four "extended" subband coefficient sub-tiles of length tileLength/2+maxFilterSize at the resolution i are read from the coefficient strips data structure and transformed to a tile of pixels at the next higher resolution using losslessWaveletdTransformType(i). If i+1<dyadicResolution (ROI), the tile of pixels obtained by this step is inserted into the pixel memory strip at the resolution i+1. If i+1=dyadicResolution (ROI) the tile of pixels is processed by the next step of color transform. Recall frofrom section 5.1.1 that the "half bits" are initialized to zero, therefore the inverse step is well defined even if their "real" value is not available in the client yet.

6.5.5 Step 1103: Inverse Color Transform

This is an inverse step to step 603 performed at the server 120. It is performed only for tiles of pixels at the resolution highestSubbandResolution. At this stage, all of the pixels of each such tile are in the outputColorSpace and so need to be transformed into a displaying or printing color space. For example, if the original image at the server 120 is a color image in the color space RGB, the pixels obtained by the previous step of inverse subband transform are in the compression color space YUV. To convert back from YUV to RGB, we use the inverse step described in FIG. 13. If the ROI is at an exact dyadic resolution, then the tile of pixels in the rendering color space is written into the off-screen buffer. Else it is resized in the next step.

6.5.6 Step 1104: Image Resize

In case the resolution of the ROI is not an exact dyadic resolution, the image obtained by the previous step must be re-sized to this resolution. This can be accomplished using operating system imaging functionality. In most cases the operating system's implementation is sub-sampling which produces in many cases an aliasing effect which is not visually pleasing. To provide higher visual quality, the imaging system of the present invention may use a method of linear interpolation, such as described in J. Proakis and D. Manolakis, "Digital signal processing", Prentice Hall, 1996. The output of the linear interpolation step is written to the off-screen buffer. From there it is displayed on the screen using system device dependant methods.

6.5.7 Step 1105: Mapping to 8-Bit Screen

When luminanceMap is active mapping to 8-bit screen is performed using the mapping function described in section 6.1.1.

7. Server Worflow

Figure 5:
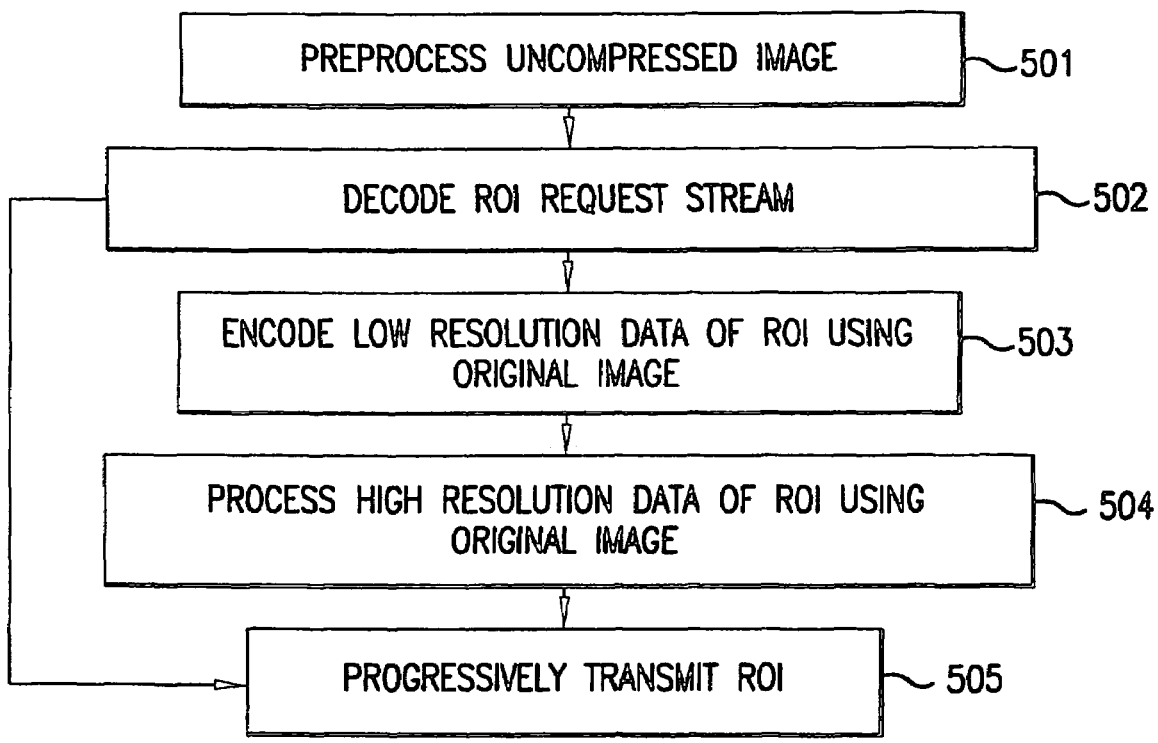
FIG. 5 is a diagram depicting the server workflow.

With reference to FIG. 5, the operation of the server computer 120 (FIG. 1) will now be described. Initially, an uncompressed digital image is stored in, for example, storage 122 of the server computer 120. This uncompressed digital image may be a two-dimensional image, stored with a selected resolution and depth. For example, in the medical field, the uncompressed digital image may be contained in a DICOM file.

Once the client computer 110 requests to view or print a certain image, the server performs the preprocessing step 501. This step is a computation done on data read from the original digital image. The results of the computation are stored in the server cache device 121. After this fast computation a "ready to serve" message is sent from the server to the client containing basic information on the image.

In step 502, the server receives an encoded stream of requests for data blocks associated with a ROI that needs to be rendered at the client. The server then decodes the request stream and extracts the request list.

In step 503, the server reads from cache or encodes data blocks associated with low resolution portions of the ROI, using the cached result of the preprocessing stage 501.

If the ROI is a high-resolution portion of the image, the server, in step 504, reads from cache or performs a "local" and efficient version of the preprocessing step 501. Specifically, a local portion of the uncompressed image, associated with the ROI, is read from the storage 122, processed and encoded. In step 505, the data that was encoded in steps 503-504 is progressively sent to the client in the order it was requested.

7.1 Step 501: Preprocessing

Figure 6:
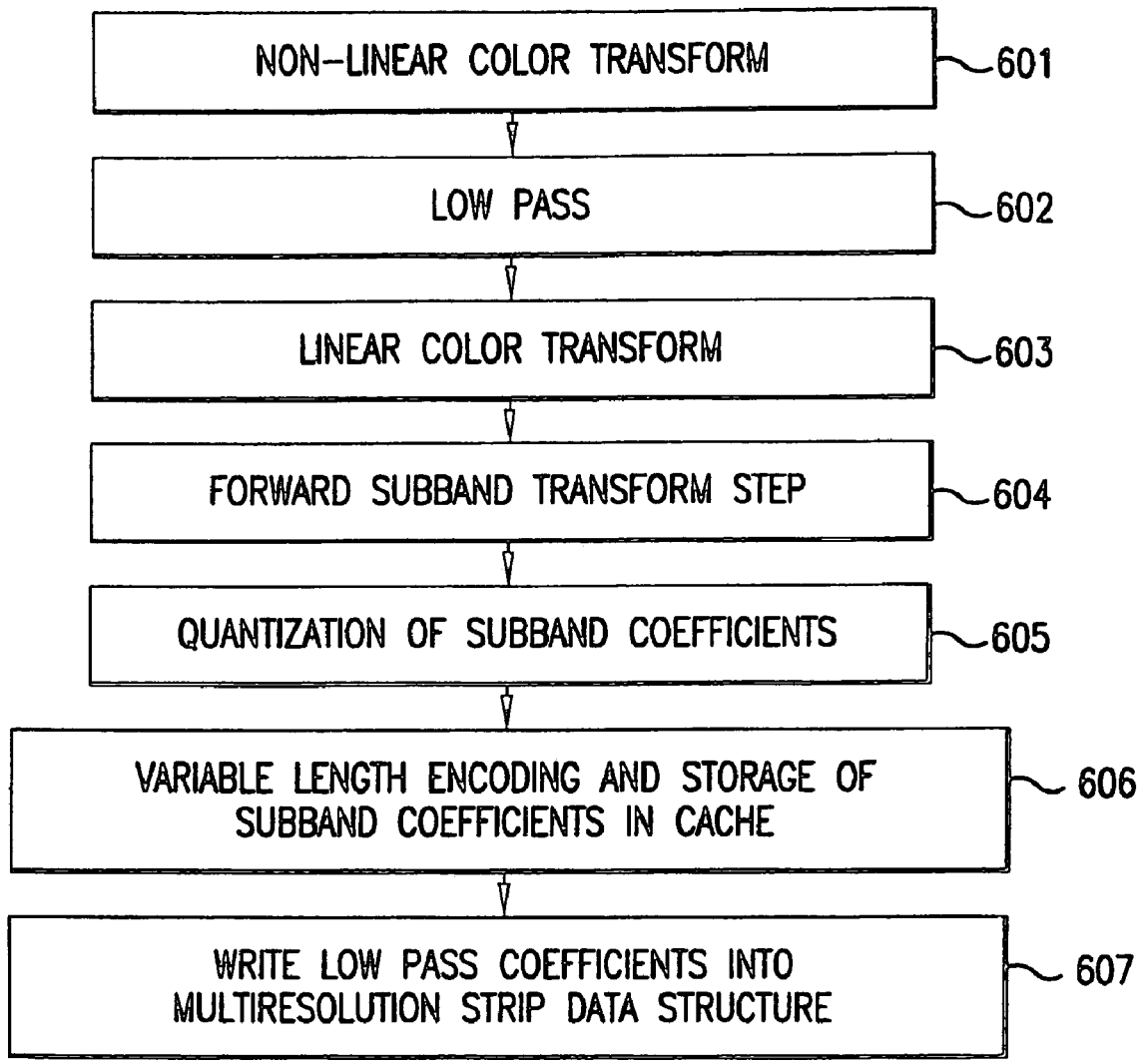
FIG. 6 is a diagram describing the server-preprocessing step.

The preprocessing step is now described with respect to FIG. 6. The goal of the preprocessing algorithm is to provide the fastest response to the user's request to interact with the image. Once this fast computational step is performed, the server is able to provide efficient "pixel-on-demand" transmission of any client ROI requests that follow. In most cases the first ROI is a view of the full image at the highest resolution that "fits" the viewing device. The preprocessing algorithm begins with a request for an uncompressed image that has not been processed before or has been previously processed but the results of which have been deleted from the cache. As explained hereinabove, this unique algorithm replaces the possibly simpler procedure of encoding the full image into some progressive format. This latter technique will provide a much slower response to the user's initial request then the technique described below. At the end of the algorithm a "ready to serve ROI of the image" message is sent to the client containing basic information on the image. While some of this information, image dimensions, original color space, resolution etc., is available to the user of the client computer, most of this information is "internal" and required by the client to formulate ROI request lists (§6.2) and progressively render (§6.5). Next we describe in detail the preprocessing algorithm.

7.1.1 Preprocessing Parameters

TABLE 8

| Variable | Meaning |
| --- | --- |
| losslessMode | If true, preprocessing will prepare data that can be used for lossless transmission. |
| subbandTransformType | The framework allows the ability to select a different subband transform for each resolution of each image. The technical term is: non-stationary transforms. |
| numberOfResolutions | The number of resolutions in the Multiresolution structure calculated for the image. Typically, numberOfResolutions = $\log_2(\sqrt{ImageSize})$. |
| jumpSize | A number in the range [0, numberOfResolutions − 1]. The preprocessing stage computes only the top lower part of the image's multiresolution pyramid of the size numberOfResolutions − jumpSize. |
| tileLength | Typically = 64. Tradeoff between time and coding performance. |
| nTilesX (j) | Number of subband tiles in the x direction at the resolution j |
| nTilesX (j) | Number of subband tiles in the y direction at the resolution j |
| inputColorSpace | Color space of uncompressed original image. |
| outputColorSpace | Transmitted color space used as part of the encoding technique. |
| numberOfComponents | Number of components in OutputColorSpace. |
| threshold (c, j) | A matrix of values used in lossy compression. The subband coefficients of the component c at the resolution j with absolute value below threshold (c, j) are considered as (visually) insignificant and set to zero. |

Given an input image, the parameters described in Table 8 are computed or chosen. These parameters are also written into a header sent to the client 110 and are used during the progressive rendering step 405 (see section 6.5, described infra). The important parameters to select are:

1. losslessMode: In this mode, progressive transmission of images takes place until lossless quality is obtained. Choosing this mode requires the preprocessing algorithm to use certain reversible wavelet transforms, and can slow down the algorithm.
2. subbandTransformType(j): The (dynamic) selection of wavelet basis (as described, for example, in I. Daubechies, "Ten lectures on wavelets", Siam, 1992) is crucial to the performance of the imaging system. The selection can be non-stationary, meaning a different transform for each resolution j. The selection is derived from the following considerations:

a. Coding performance (in a rate/distortion sense): This is a requirement of any subband/wavelet transform.
b. Approximation of ideal low pass: It is favorable to choose a transform such that low resolutions of the image will be of high visual quality (some filters produce poor quality low resolutions even before any compression takes place).
c. Fast transform implementation: Whether the associated fast transform can be implemented using lifting steps (as described, for example, by I. Daubechies and W. Sweldens, "Factoring wavelet transforms into lifting steps", J. Fourier Anal. Appl., Vol. 4, No. 3, pp. 247-269, 1998), using only integer shifts and additions, etc. Some good examples are the Haar and CDF transforms (1,3), (2,2) described in I. Daubechies, "Ten lectures on wavelets", Siam, 1992.
d. Fast low pass implementation: A very important parameter, since together with the parameter jumpSize, it determines almost all of the complexity of the algorithm. For example, the CDF (1,3) is in this respect the "optimal" transform with three vanishing moments. Since the dual scaling function is the simple B-spline of order 1, its low pass is simple averaging. Thus, the sequence of CDF transforms, using the B-spline of order 1 as the dual scaling function, but with wavelets with increasing number of vanishing moments are in some sense optimal in the present system. They provide a framework for both real time response and good coding efficiency.
e. Lossless mode: If losslessMode is true we must choose the filters from a subclass of reversible transforms (see, for example, "Wavelet transforms that map integers to integers", A. Calderbank, I. Daubechies, W. Sweldens, B. L. Yeo, J. Fourier Anal. Appl., 1998).
f. Low system I/O: If the network 130 in FIG. 1 connecting between the Image residing on the storage 122 and the imaging server 120 is slow, the bottleneck of the preprocessing stage and possibly the whole imaging system might simply be the reading of the original image. In such a case a transform may be chosen with a lazy sub-sampling low pass filter that corresponds to efficient selective reading of the input image. Many interpolating subband transforms with increasing number of vanishing moments can be selected to suit this requirement. However, this choice should be avoided whenever possible, since it conflicts with considerations (a) and (b).
g. Image type: If the type of the image is known in advance, an appropriate transform can be chosen to increase coding efficiency. For example: Haar wavelet for graphic images, smoother wavelet for real-life images, etc. In the graphic arts field, there are numerous cases of documents composed of low resolution real-life images and high resolution graphic content. In such a case, a non-stationary sequence of transforms may be chosen: Haar for the high resolutions and a smoother basis starting at the highest resolution of a real-life image part. In case of low system I/O (f), a non-stationary choice of interpolating transforms of different orders is required.

3. jumpSize: This parameter controls the tradeoff between fast response to the user's initial request to interact with the image and response times to subsequent ROI requests. When jumpSize is large, the initial response is faster, but each computation of a region of interest with higher resolution than the jump might require processing of a large portion of the original image.

4. InputColorSpace: The input color spaces supported in lossless mode are:
a. Grayscale: For grayscale images
b. RGB 5. outputColorSpace: The following are color spaces which perform well in coding:
a. Grayscale: For grayscale images
b. YUV: for viewing color images Referring to Table 8, losslessMode is set to true. Threshold (c, j) is not in use, since in lossless mode, there is no thresholding. The rest of the variables have the same meaning as in the lossy algorithm.

7.1.2 Memory Constraint Multiresolution Scan Data Structure

Most prior art wavelet coding algorithms do not address the problem of memory complexity. Usually these prior art algorithms assume there is sufficient memory such that the image can be transformed in memory from a time domain representation to a wavelet frequency domain representation. The upcoming JPEG2000 standard will likely address this issue, as did its predecessor, the JPEG standard. The preprocessing algorithm also requires performing subband transforms on large images, although not always on the full image, and thus requires careful memory management. This means that the memory usage of the algorithm is not of the order of magnitude of the original image, as described in J. M. Shapiro, "An embedded hierarchical image coder using zero-trees of wavelet coefficients", IEEE Trans. Sig. Proc., Vol. 41, No. 12, pp. 3445-3462, 1993.

Given an uncompressed image we allocate the following number of memory strips $$\text{numberOfComponents} \times (\text{numberOfResolutions} - \text{jumpSize})$$

of sizes $$[2^{-(\text{numberOfResolutions}-j)}\text{imageWidth}, 3 \times \text{tileLength}/2 + \text{maxFilterSize}]$$

for $1 \leq j \leq \text{numberOfResolutions} - \text{jumpSize} - 1$ and $$[\text{imageWidth}, \text{tileLength} + 2 \times \text{maxFilterSize}]$$

for $j = \text{numberOfResolutions} - \text{jumpSize}$

That is, the memory usage is proportional to $2^{-jumpSize} \times$ imageWidth. Each such strip stores low-pass coefficients in the color space outputColorSpace at various resolutions.

Referring to FIG. 6, during the preprocessing stage, the resolutions are scanned simultaneously from start to end in the y direction. For each color component and resolution, the corresponding strip stores low-pass coefficients or pixels at that resolution. The core of the preprocessing algorithm are steps 604-607, where tiles of pixels of length tileLength+2× maxFilterSize are read from the memory strips and handled one at a time. In step 604 the tile is transformed into a tile of length tileLength containing two types of coefficient data: subband coefficients and pixels at a lower resolution. The subband coefficients are processed in steps 605-606 and stored in the cache. The lower resolution pixels are inserted in step 607 to a lower resolution memory strip. Whenever such a new sub-tile of lower resolution pixels is inserted into a strip, the memory management module of the algorithm performs the following check: If the part of the sub-tile exceeds the current virtual boundaries of the strip, the corresponding first lines of the strip are considered unnecessary and their memory is (virtually) re-allocated for the purpose of storing the new sub-tile data.

7.1.3 Step 601: Lossless Color-transform

This step uses the conversion formula described in FIG. 13 and must be performed before step 602, because the lossless color conversion is non-linear.

7.1.4 Step 602: Lossless Wavelet Low Pass

The motivation for the low pass step is explained in § 6.1.4 in the above-cited U.S. Pat. No. 6,314,452, which disclosure is incorporated herein by reference. Several important aspects of lossless mode are emphasized below.

Figure 26:
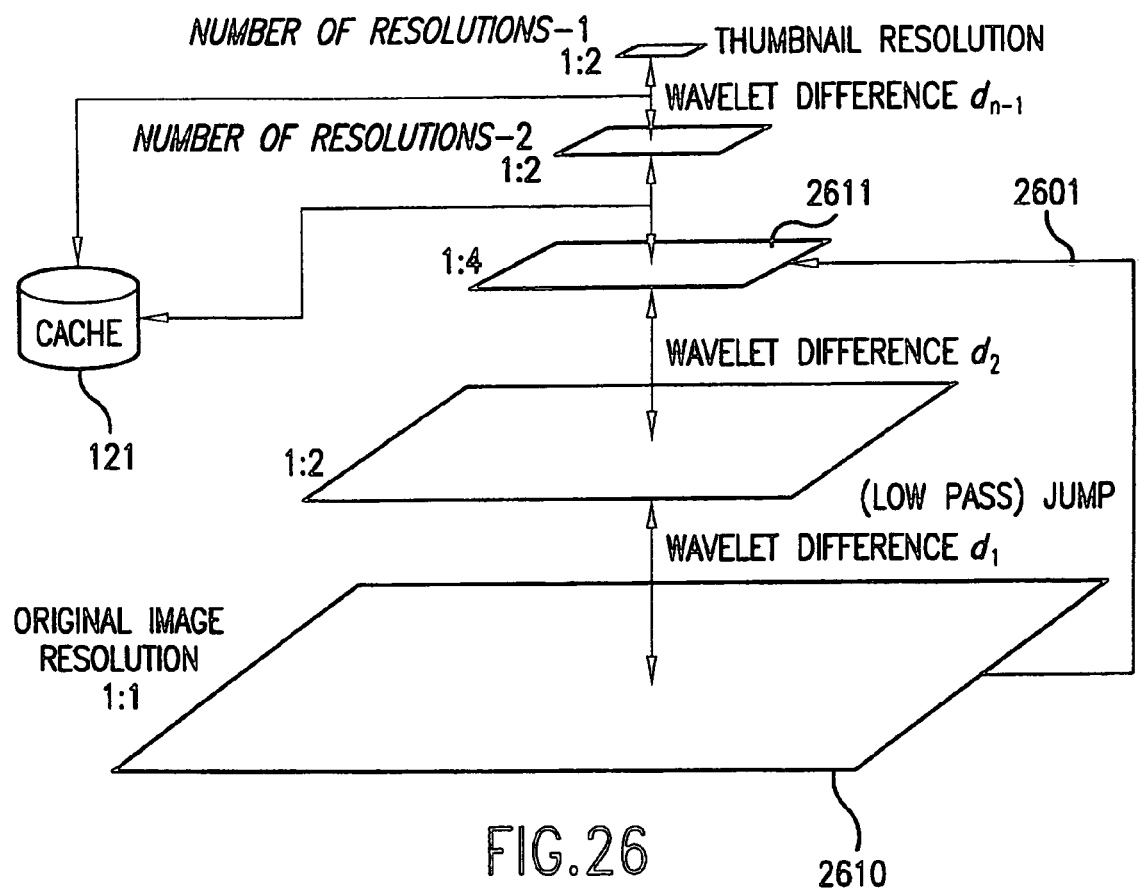
FIG. 26 is a diagram depicting the preprocessing multi-resolution structure.

In step 602, the low pass filter of the transform subbandTransformType(j), numberOfResolutions−jumpSize<j≦numberOfResolutions, are used to obtain a low resolution strip at the resolution numberOfResolutions−jumpSize (as can be seen in FIG. 26). Typically, it is required to low pass filter about $2^{jumpSize}$ lines of the original image 1010 to produce one line of the low resolution image. The low pass filter calculation is initiated by reading tiles of pixels from the memory strips performed in step 604. Whenever there is an attempt to read missing low resolution lines, they are computed by low pass filtering the original image and inserting the results into the memory strip. The insertion over-writes lines that are no longer required such that the algorithm is memory constrained. In the case where a non-linear color transform took place in the previous step 601, the results of that transform are low pass filtered.

In the lossless mode of operation, the jumpSize parameter defines the number of lossless wavelet low pass filtering steps that should be done. A single low pass filtering step is the same for Haar and CDF (1,3) and defined by the following two stages (taken from equations (3.20) and (3.22)):

X-direction: $s(n) = \left\lfloor \dfrac{x(2n) + x(2n+1)}{2} \right\rfloor$

Y-direction: $s(n) = x(2n) + x(2n+1)$.

Namely, in a 2D representation, the low pass step is defined by $$ll(m, n) = \left\lfloor \dfrac{x(2m+1, 2n+1) + x(2m, 2n+1)}{2} \right\rfloor + \left\lfloor \dfrac{x(2m+1, 2n) + x(2m, 2n)}{2} \right\rfloor. \quad (7.1)$$

For jumpSize=1 and jumpSize=2 (other sizes typically are not needed), the server performs these steps efficiently (almost like the lossy algorithm) by a single operation that simulates exactly jumpSize low pass steps defined in (7.1). As noticed from (7.1), the simplicity of the formula makes filters such as Haar and CDF (1,3) "optimal" with respect to low pass efficiency.

7.1.5 Step 603: Forward Lossless Wavelet Transform

In Step 603 we perform one step of an efficient local lossless wavelet transform (§3), on a tile of pixels at the resolution 1≦j≦numberOfResolutions−jumpSize . The type of transform is determined by the parameter losslessWaveletTransformType(j). As described in FIG. 1, the transform is performed on an "extended" tile of pixels of length tileLength+2×maxFilterSize (unless we are at the boundaries), read directly from a multi-resolution strip at the resolution j+1. The output of this step is a lossless subband tile composed of wavelet coefficients including Half bit coefficients and low resolution coefficients/pixels. The transform step is efficiently implemented in integers as described in §3.

The subband transform of step 603 outputs three types of data: scaling function (low pass), wavelet (high pass) and Halfbits. The wavelet coefficients are treated in step 604 while the scaling function coefficients are treated in step 605. Note that tiles of pixels which are located on the boundaries sometimes need to be padded by extra rows and/or columns of pixels, such that they will formulate a "full" tile of length tileLength.

7.1.6 Step 604: Variable Length Encoding and Storage

In step 604, the subband coefficients that are calculated in step 603 are variable length encoded and stored in the cache 121. If maxBitPlane (tile)=0 we do not write any data. Else we loop on the coefficient groups $\{coef\ (2\times i+x, 2\times j+y)\}_{x,y=0,1}$. For each such group we first write the group's variable length length (i, j) using $\log_2$ (maxBitPlane(tile)) bits. Then for each coefficient in the group we write length (i, j)+1 bits representing the coefficient's value. The least significant bit represents the coefficient's sign: if it is 1 then the variable length encoded coefficient is assumed to be negative. The HalfBit subband coefficients are written one bit per coefficient.

7.1.7 Step 605: Copying Low Pass Coefficients into the Multiresolution Strip Structure In step 503, unless losslessMode is true, the subband coefficients calculated in step 604 are quantized. This procedure is performed at this time because it is required that the coefficients computed in the previous step be stored in the cache 121. To avoid writing huge amounts of data to the cache, some compression is required. Thus, the quantization step serves as a preparation step for the following variable length encoding step. It is important to point out that the quantization step has no effect on compression results. Namely, the quantization step is synchronized with the encoding algorithm such that the results of the encoding algorithm of quantized and non-quantized coefficients are identical.

A tile of an image component c at the resolution j is quantized using the given threshold threshold (c, j): for each coefficient x, the quantized value is $\lfloor x/\text{threshold}\ (c, i)j \rfloor$. It is advantageous to choose the parameters threshold (c, j) to be dyadic such that the quantization can be implemented using integer shifts. The quantization procedure performed on a subband tile is as follows:

1. Initialize maxBitPlane(tile)=0.
2. Loop over each group of four coefficients $\{coef(2\times i+x, 2\times j+y)\}_{x,y=0,1}$. For each such group initialize a variable length parameter length (i, j)=0 .
3. Quantize each coefficient in the group coef (2×i+x, 2×j+y) using the appropriate threshold.
4. For each coefficient, update length (i, j) by the bit plane b of the coefficient, where the bit plane is defined by

|coef(2×i+x,2×j+y)|∈[$2^b$threshold(c, j),$2^{b+1}$threshold (c, j))

5. After processing the group of four coefficients, use the final value of length (i, j) to update maxBitPlane(tile) by maxBitPlane (tile)=max (maxBitPlane (tile), length (i, j))

6. At the end of the quantization step, store the value maxBitPlane(tile) in the cache 121.

Note that for subband tiles located at the boundaries we can set to zero subband coefficients that are not associated with the actual image, but only with a padded portion. To do this we take into account the amount of padding and the parameter maxFilterSize. The motivation for the "removal" of these coefficients is coding efficiency.

7.2 Step 502: Decoding the Request Stream

This is the inverse step of section 6.3. Once the request stream arrives at the server 120, it is decoded back to a data block request list. Each data structure the type representing a group of requested data blocks is converted to the sub-list of these data blocks.

7.3 Step 503: Encoding Low Resolution Part of ROI

Figure 7:
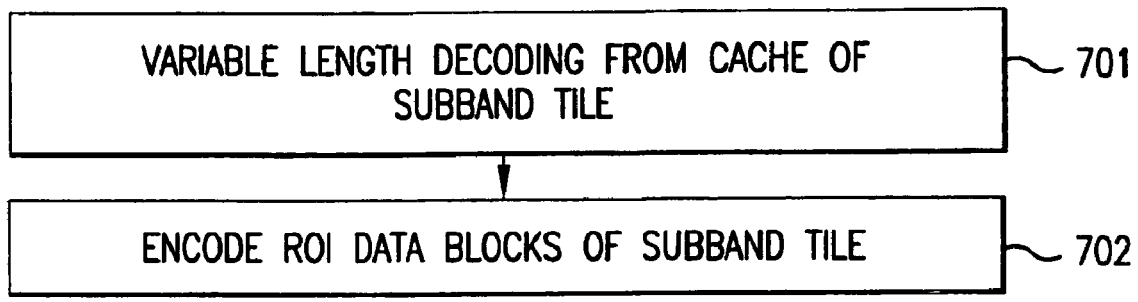
FIG. 7 is a diagram describing the low resolution encoding process.

Step 503, described in FIG. 7, is only performed when the data blocks associated with a low-resolution subband tile are not available in the server cache 121.

Step 701 is the inverse step of step 604 described in §7.1.6. In the preprocessing algorithm subband tiles of lower resolution, that is resolutions lower than numberOfResolutions−jumpSize, were stored in the cache using a variable length type algorithm. For such a tile we first need to decode the variable length representation. The algorithm uses the stored value maxBitPlane(tile).

1. If maxBitPlane(tile)=0, then all the coefficients are set to zero including the HalfBit subband.
2. If maxBitPlane(tile)=1, then all the coefficients are set to zero, and the HalfBit subband coefficient are read bit by bit from cache.
3. Else, as performed in 2, the HalfBit subband coefficient are read bit by bit from cache, and we perform the following simple decoding algorithm:

For each group of four coefficients $\{coef\ (2 \times i+x, 2 \times j+y)\}_{x,y=0,1}$, we read $\log_2$ (maxBitPlane(tile)) bits representing the variable length of the group.

Assume the variable length is length (i, j). For each of the four coefficients we then read length (i, j)+1 bits. The least significant bit represents the sign. The reconstructed coefficient takes the value:

$$(readBits \gg 1) \times \begin{cases} -1 & readBits\ \&\ 1 = 1 \\ 1 & readBits\ \&\ 1 = 0 \end{cases}$$

In step 702 we use the encoding algorithm described in §5.1 to encode the requested data blocks associated with the extracted subband tile.

7.4 Step 504: Processing High Resolution Part of ROI

Figure 8:
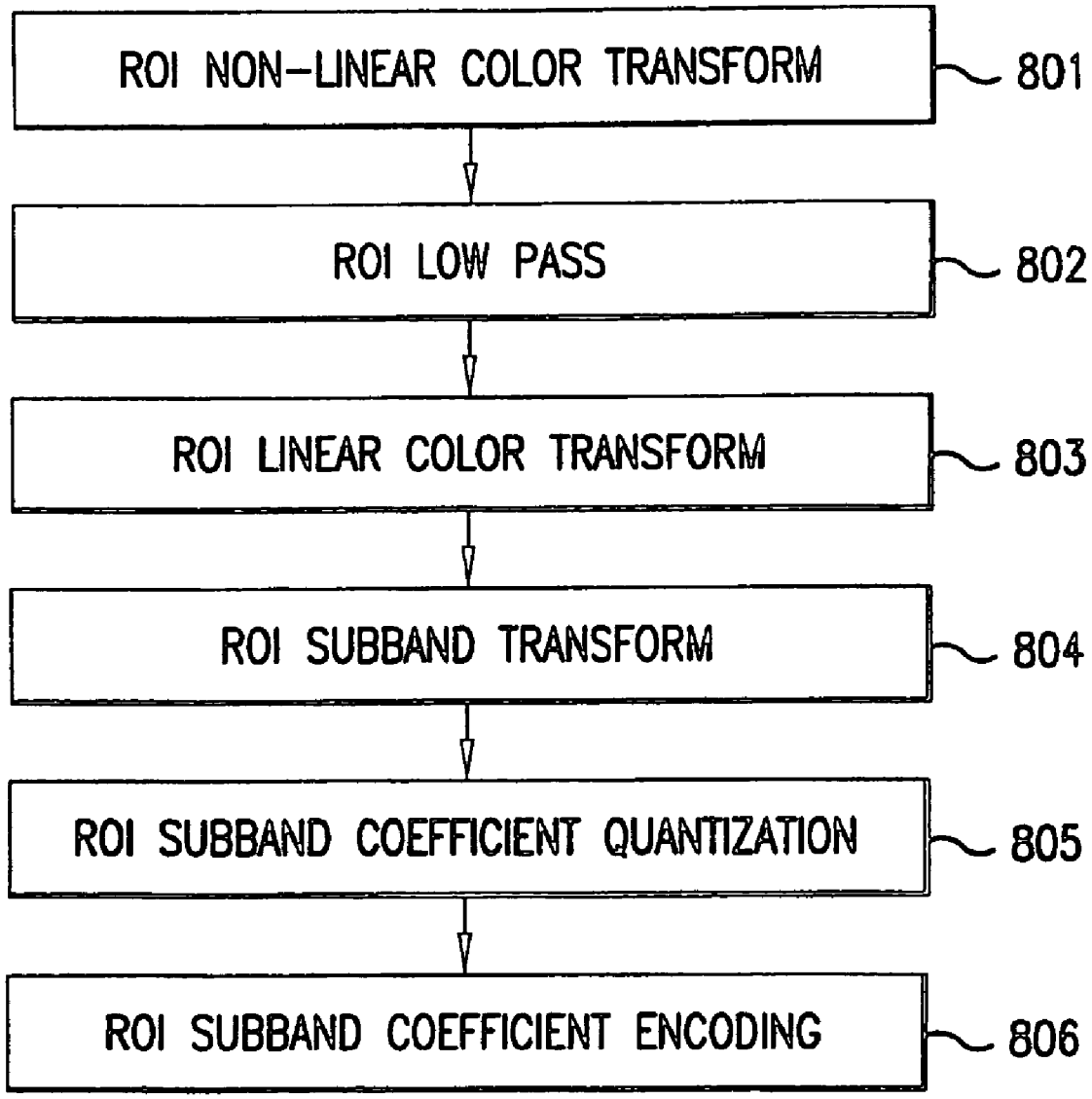
FIG. 8 is a diagram describing the ROI high resolution processing.
Figure 9:
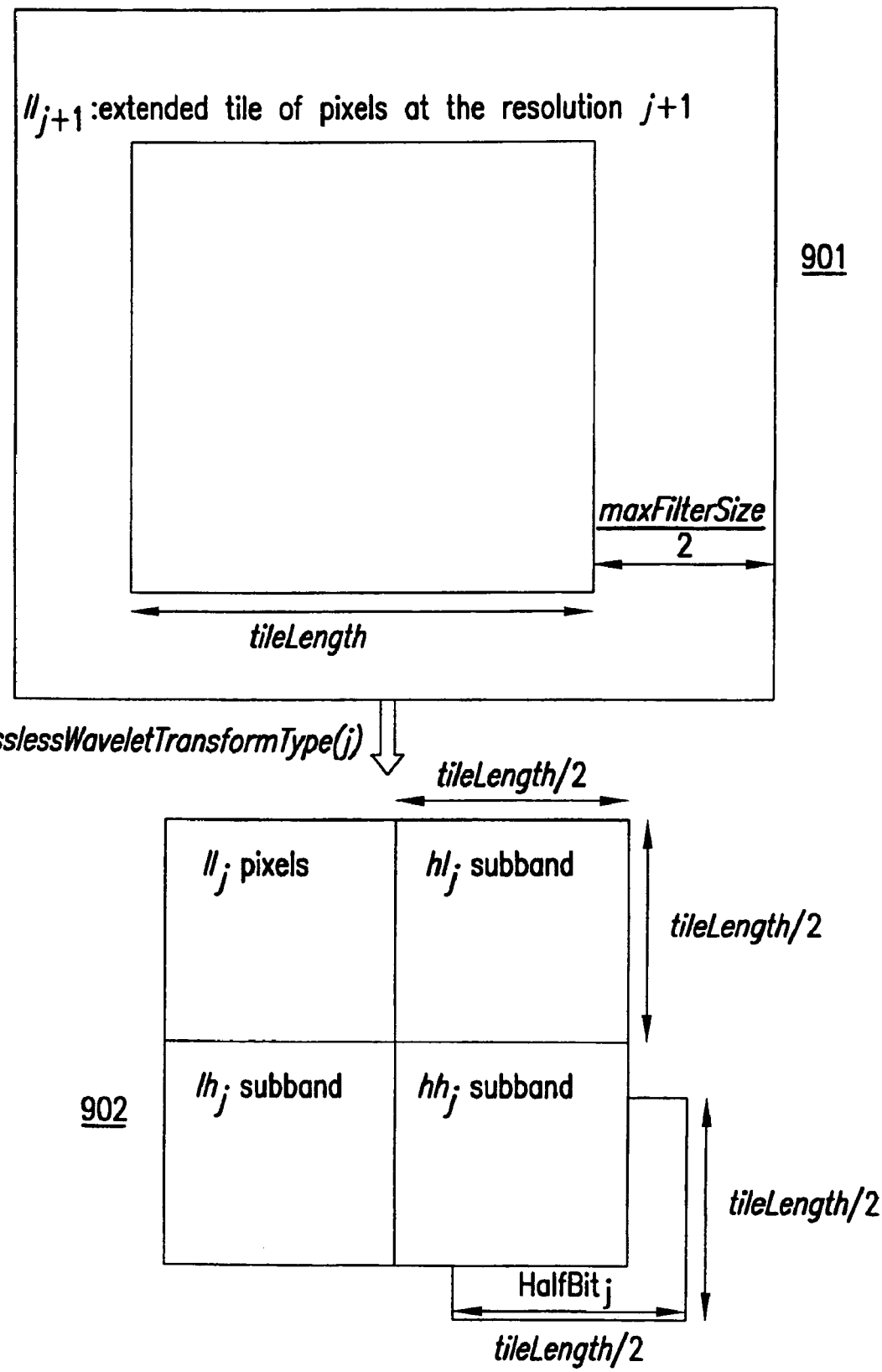
FIG. 9 is a diagram depicting the local forward lossless wavelet transform.

Step 504 is described in FIG. 8. In case we have used jumpSize>0 in step 501 and the resolution of the ROI>numberOfResolutions−jumpSize, we are sometimes required to perform a local variation of the preprocessing step described in §7.1. Whenever the server receives a request list of data blocks we check the following. If a data block has been previously computed (present in the cache 121) or is associated with a low resolution subband tile data block then it is either simply read from the cache or handled in step 503. Else, the coordinates of the data block are used to find the "minimal" portion of the ROI that needs to be processed. Then, a local version of the preprocessing algorithm is performed for this local portion. The difference here is that step 804 replaces Variable Length coding step 604 of the preprocessing algorithm by the encoding algorithm given in §5.1.

7.5 Step 505: Progressive Transmission of ROI

In the final step, the encoded data tiles are sent from the server 120 to the client 110, in the order they were requested. In many cases, data blocks will be empty. For example, for a region of the original image with a constant pixel value, all of the corresponding data blocks will be empty, except for the first one that will contain only one byte with the value zero representing maxBitPlane(tile)=0. For a low activity region of the image, only the last data blocks representing higher accuracy will contain any data. Therefore, to avoid the extra side information, rectangles of empty data blocks are collected and reported to the client 110 under the restriction that they are reported in the order in which they were requested. For blocks containing actual data, only the data block's size in bytes need be reported, since the client 110 already knows which data blocks to expect and in which order.

The present invention has been described in only a few embodiments, and with respect to only a few applications (e.g., commercial printing and medical imaging). Those of ordinary skill in the art will recognize that the teachings of the present invention may be used in a variety of other applications where images are to be transmitted over a communication media.

What is claimed is:

1. A system for lossless progressive streaming of images over a communication network, comprising:

an image storage device for storing a digital image;

a client computer coupled to the communication network, wherein said client computer generates and transmits across said communication network a request list containing the coordinates of data blocks required for rendering a region of interest (ROI) within said digital image, wherein said request list is ordered in accordance with a selected progressive mode;

a server computer coupled to said communication network and said image storage device, said server computer adapted to perform the steps of:

preprocessing said digital image through a low pass filter and a lossless wavelet transformation;

receiving said request list from said client computer;

progressively transmitting to said client computer data blocks corresponding to said region of interest in the order they were requested;

wherein said lossless wavelet transform comprises the steps of:

first applying an X-direction wavelet transform to the output of said low pass filter to yield a temporal matrix therefrom;

second applying a low Y-direction wavelet transform to a low portion of said temporal matrix to yield LL and LH subband coefficients; and third applying a high Y-direction wavelet transform to a high portion of said temporal matrix to yield HL and HH subband coefficients including a half-bit matrix containing half-bits, each half-bit corresponding to an HH subband coefficient.

2. The system according to claim 1, wherein the server computer progressively transmits the region of interest to a selected quality threshold.

3. The system according to claim 1, wherein the server computer progressively transmits the region of interest to lossless quality.

4. The system according to claim 1, wherein the client computer reverse transforms the region of interest received from the server computer, to form a lossless reproduction of the digital image.

5. The system according to claim 4, wherein client computer displays the lossless reproduction of the digital image on a web browser resident on the client computer.

6. The system according to claim 1, wherein the server computer performs the pre-processing step through a lossless wavelet transformation comprising non-identical one-dimensional transforms.

7. The system according to claim 1, wherein said selected progressive mode comprises progressive by quality whereby said request list is ordered in accordance with the absolute value of requested subband coefficients such that subband coefficients with largest absolute values are requested before subband coefficients with smaller absolute values.

8. The system according to claim 1, wherein said selected progressive mode comprises progressive by resolution whereby lower resolution data blocks are requested before higher resolution data blocks.

9. The system according to claim 1, wherein said selected progressive mode comprises progressive by spatial order whereby data blocks are requested from top to bottom.

10. A system for lossless progressive streaming of images over a communication network, comprising:
   an image storage device for storing a digital image;
   a client computer coupled to the communication network, wherein said client computer generates and transmits across said communication network a request list containing the coordinates of data blocks required for rendering a region of interest (ROI) within said digital image, wherein said request list is ordered in accordance with a selected progressive mode;
   a server computer coupled to said communication network and said image storage device, said server computer adapted to perform the steps of:
      preprocessing said digital image through a low pass filter and a lossless wavelet transform to yield low pass scaling function data, high pass wavelet coefficient data and halfbit data;
      receiving said request list from said client computer;
      progressively transmitting to said client computer subband coefficient data blocks corresponding to said region of interest in the order they were requested, said subband coefficient data blocks defined by said coordinates and determined in accordance with said wavelet coefficients and said half-bit matrix;
   wherein said lossless wavelet transform comprises the steps of:
      first applying an X-direction wavelet transform to the output of said low pass filter to yield a temporal matrix therefrom;
      second applying a low Y-direction wavelet transform to a low portion of said temporal matrix to yield LL and LH subband coefficients; and
      third applying a high Y-direction wavelet transform to a high portion of said temporal matrix to yield HL and HH subband coefficients including a half-bit matrix containing half-bits, each half-bit corresponding to an HH subband coefficient.

11. The system according to claim 10, wherein the server computer progressively transmits the region of interest to a selected quality threshold.

12. The system according to claim 10, wherein the server computer progressively transmits the region of interest to lossless quality.

13. The system according to claim 10, wherein said client computer reverse transforms the region of interest received from the server computer, to form a lossless reproduction of the digital image.

14. The system according to claim 13, wherein said client computer displays the lossless reproduction of the digital image on a web browser resident on the client computer.

15. The system according to claim 10, wherein the server computer performs the pre-processing step through a lossless wavelet transformation comprising two non-identical one-dimensional transforms.

16. The system according to claim 10, wherein said selected progressive mode comprises progressive by quality whereby said request list is ordered in accordance with the absolute value of requested subband coefficients such that subband coefficients with largest absolute values are requested before subband coefficients with smaller absolute values.

17. The system according to claim 10, wherein said selected progressive mode comprises progressive by resolution whereby lower resolution data blocks are requested before higher resolution data blocks.

18. The system according to claim 10, wherein said selected progressive mode comprises progressive by spatial order whereby data blocks are requested from top to bottom.

19. A method for use on a client computer for lossless progressive streaming of images from a server computer to said client computer over a communication network, said method comprising the steps of:
   determining one or more data blocks required for rendering of a region of interest (ROI) within said digital image;
   generating a request list of coordinates corresponding to said data blocks, wherein said request list is ordered in accordance with a selected progressive mode;
   transmitting said request list to said server computer;
   receiving said data blocks from said server computer;
   rendering said region of interest utilizing said data blocks;
   wherein said data blocks are generated on said server utilizing a lossless wavelet transform comprising the steps of:
   first applying an X-direction wavelet transform to the output of a low pass filter to yield a temporal matrix therefrom;
   second applying a low Y-direction wavelet transform to a low portion of said temporal matrix to yield LL and LH subband coefficients; and
   third applying a high Y-direction wavelet transform to a high portion of said temporal matrix to yield HL and HH subband coefficients including a half-bit matrix containing half-bits, each half-bit corresponding to an HH subband coefficient.

20. The method according to claim 19, wherein the server computer progressively transmits the region of interest to a selected quality threshold.

21. The method according to claim 19, wherein the server computer progressively transmits the region of interest to lossless quality.

22. The method according to claim 19, further comprising the step of reverse transforming at the client computer the region of interest received from the server computer, to form a lossless reproduction of the digital image.

23. The method according to claim 22, further comprising the step of displaying at the client computer the lossless reproduction of the digital image on a web browser resident on the client computer.

24. The method according to claim 19, wherein the pre-processing step is performed through a lossless wavelet transformation comprising two non-identical one-dimensional transforms.

25. The method according to claim 19, wherein said selected progressive mode comprises progressive by quality whereby said request list is ordered in accordance with the absolute value of requested subband coefficients such that subband coefficients with largest absolute values are requested before subband coefficients with smaller absolute values.

26. The method according to claim 19, wherein said selected progressive mode comprises progressive by resolution whereby lower resolution data blocks are requested before higher resolution data blocks.

27. The method according to claim 19, wherein said selected progressive mode comprises progressive by spatial order whereby data blocks are requested from top to bottom.

28. A method for use on a client computer for lossless progressive streaming of images from a server computer to said client computer over a communication network, said method comprising the steps of:
  determining one or more data blocks required for rendering of a region of interest (ROI) within said digital image;
  generating a request list of coordinates corresponding to said data blocks, wherein said request list is ordered in accordance with the absolute value of requested subband coefficients whereby subband coefficients with larger absolute values are requested before subband coefficients with smaller absolute values;
  transmitting said request list to said server computer;
  receiving said data blocks from said server computer;
  rendering said region of interest utilizing said data blocks;
  wherein said data blocks are generated on said server utilizing a lossless wavelet transform comprising the steps of:
  first applying an X-direction wavelet transform to the output of a low pass filter to yield a temporal matrix therefrom;
  second applying a low Y-direction wavelet transform to a low portion of said temporal matrix to yield LL and LH subband coefficients; and
  third applying a high Y-direction wavelet transform to a high portion of said temporal matrix to yield HL and HH subband coefficients including a half-bit matrix containing half-bits, each half-bit corresponding to an HH subband coefficient.

29. The method according to claim 28, wherein the server computer progressively transmits the region of interest to a selected quality threshold.

30. The method according to claim 28, wherein the server computer progressively transmits the region of interest to lossless quality.

31. The method according to claim 28, further comprising the step of reverse transforming at the client computer the region of interest received from the server computer, to form a lossless reproduction of the digital image.

32. The method according to claim 31, further comprising the step of displaying at the client computer the lossless reproduction of the digital image on a web browser resident on the client computer.

33. The method according to claim 28, wherein the pre-processing step is performed through a lossless wavelet transformation comprising non-identical one-dimensional transforms.

34. The server according to claim 28, wherein said selected progressive mode comprises progressive by quality whereby said request list is ordered in accordance with the absolute value of requested subband coefficients such that subband coefficients with largest absolute values are requested before subband coefficients with smaller absolute values.

35. The server according to claim 28, wherein said selected progressive mode comprises progressive by resolution whereby lower resolution data blocks are requested before higher resolution data blocks.

36. The server according to claim 28, wherein said selected progressive mode comprises progressive by spatial order whereby data blocks are requested from top to bottom.

37. A server for lossless progressive streaming of images to a client over a communication network, comprising:
  an image storage device for storing said digital image;
  a processor adapted to perform the steps of:
    preprocessing said digital image through a low pass filter lossless wavelet transformation;
    receiving said request list from said client, wherein said request list is ordered in accordance with a selected progressive mode;
    progressively transmitting to said client data blocks corresponding to said region of interest in the order they were requested;
  wherein said lossless wavelet transform comprises the steps of:
    first applying an X-direction wavelet transform to the output of said low pass filter to yield a temporal matrix therefrom;
    second applying a low Y-direction wavelet transform to a low portion of said temporal matrix to yield LL and LH subband coefficients; and
    third applying a high Y-direction wavelet transform to a high portion of said temporal matrix to yield HL and HH subband coefficients including a half-bit matrix containing half-bits, each half-bit corresponding to an HH subband coefficient.

38. The server according to claim 37, wherein the server computer progressively transmits the region of interest to a selected quality threshold.

39. The server according to claim 37, wherein the server computer progressively transmits the region of interest to lossless quality.

40. The server according to claim 37, wherein the client computer reverse transforms the region of interest received from the server computer, to form a lossless reproduction of the digital image.

41. The server according to claim 40, wherein client computer displays the lossless reproduction of the digital image on a web browser resident on the client computer.

42. The server according to claim 37, wherein the server computer performs the pre-processing step through a lossless wavelet transformation comprising two non-identical one-dimensional transforms.

43. A server for lossless progressive streaming of images to a client over a communication network, comprising:
  an image storage device for storing said digital image;
  a processor adapted to perform the steps of:
    preprocessing said digital image through a lossless wavelet transformation;
    generating wavelet coefficients corresponding to said digital image;
    receiving said request list from said client computer, wherein said request list is ordered in accordance with the absolute value of requested subband coefficients whereby subband coefficients with larger absolute values are requested before subband coefficients with smaller absolute values;
    progressively transmitting to said client computer subband coefficient data blocks corresponding to said region of interest in the order they were requested, said subband coefficient data blocks defined by said coordinates and determined in accordance with said wavelet coefficients;

wherein said lossless wavelet transform comprises the steps of:
- first applying an X-direction wavelet transform to the output of said low pass filter to yield a temporal matrix therefrom;
- second applying a low Y-direction wavelet transform to a low portion of said temporal matrix to yield LL and LH subband coefficients; and
- third applying a high Y-direction wavelet transform to a high portion of said temporal matrix to yield HL and HH subband coefficients including a half-bit matrix containing half-bits, each half-bit corresponding to an HH subband coefficient.

44. The server according to claim 43, wherein said server computer progressively transmits the region of interest to a selected quality threshold.

45. The server according to claim 43, wherein said server computer progressively transmits the region of interest to lossless quality.

46. The server according to claim 43, wherein said client computer reverse transforms the region of interest received from the server computer, to form a lossless reproduction of the digital image.

47. The server according to claim 46, wherein said client computer displays the lossless reproduction of the digital image on a web browser resident on said client computer.

48. The server according to claim 43, wherein said server computer performs said pre-processing step through a lossless wavelet transformation comprising two non-identical one-dimensional transforms.

49. The system according to claim 43, wherein in each layer of precision the order of data block requests is set according to resolution whereby low resolution coefficient data blocks are requested first and high resolution coefficient data blocks are requested last.

50. A system for lossless progressive streaming of images over a communication network, comprising:
- an image storage device for storing a digital image;
- a client computer coupled to the communication network, wherein said client computer generates and transmits across said communication network a request list containing the coordinates of data blocks required for rendering a region of interest (ROI) within said digital image, wherein said request list is ordered in accordance with the absolute value of requested subband coefficients whereby subband coefficients with larger absolute values are requested before subband coefficients with smaller absolute values;
- a server computer, coupled to said communication network and said image storage device, adapted to perform the steps of:
  - preprocessing the digital image through a low pass filter lossless wavelet transformation;
  - receiving said request list from said client computer;
  - progressively transmitting to said client computer data blocks corresponding to said region of interest in the order they were requested;
  - wherein said lossless wavelet transform comprises the steps of:
    - first applying an X-direction wavelet transform to the output of said low pass filter to yield a temporal matrix therefrom;
    - second applying a low Y-direction wavelet transform to a low portion of said temporal matrix to yield LL and LH subband coefficients; and
    - third applying a high Y-direction wavelet transform to a high portion of said temporal matrix to yield HL and HH subband coefficients including a half-bit matrix containing half-bits, each half-bit corresponding to an HH subband coefficient.

51. A server for lossless progressive streaming of images to a client over a communication network, comprising:
- an image storage device for storing a digital image;
- a processor in communication with said image storage device and adapted to perform the steps of:
  - preprocessing said digital image through a low pass filter and a lossless wavelet transform a predetermined number of times to yield low pass scaling function data, high pass wavelet coefficient data and halfbit data;
  - storing said low pass scaling function data, said high pass wavelet coefficient data and said halfbit data in a memory cache;
  - receiving a request for one or more data blocks from said client, each data block corresponding to a region of interest;
  - if a requested data block is not present in said memory cache, performing said step of preprocessing on a minimum portion of the region of interest requiring processing;
  - transmitting to said client computer subband coefficient data blocks corresponding to said region of interest;
- wherein said lossless wavelet transform comprises the steps of:
  - first applying an X-direction wavelet transform to the output of said low pass filter to yield a temporal matrix therefrom;
  - second applying a low Y-direction wavelet transform to a low portion of said temporal matrix to yield LL and LH subband coefficients; and
  - third applying a high Y-direction wavelet transform to a high portion of said temporal matrix to yield HL and HH subband coefficients including a half-bit matrix containing half-bits, each half-bit corresponding to an HH subband coefficient.

* * * * *